（12） United States Patent
Li et al.

(10) Patent No.: US 11,379,698 B2
(45) Date of Patent: Jul. 5, 2022

(54) SENSOR DATA PROCESSING METHOD AND APPARATUS

(71) Applicant: HUAWEI TECHNOLOGIES CO., LTD., Guangdong (CN)

(72) Inventors: Wanlong Li, Beijing (CN); Feng Wen, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 103 days.

(21) Appl. No.: 16/825,145

(22) Filed: Mar. 20, 2020

(65) Prior Publication Data
US 2020/0226434 A1 Jul. 16, 2020

Related U.S. Application Data

(63) Continuation of application No. PCT/CN2018/107049, filed on Sep. 21, 2018.

(30) Foreign Application Priority Data

Sep. 22, 2017 (CN) .......................... 201710870160.5

(51) Int. Cl.
G06K 9/62 (2022.01)
B25J 9/16 (2006.01)
(Continued)

(52) U.S. Cl.
CPC .......... *G06K 9/6289* (2013.01); *B25J 9/1694* (2013.01); *G06F 17/16* (2013.01); *G06K 9/6288* (2013.01); *G06V 10/754* (2022.01); *G06V 10/76* (2022.01)

(58) Field of Classification Search
CPC .. G05D 1/0274; G05D 1/0246; G05D 1/0248; G05D 1/0231; G05D 1/024;
(Continued)

(56) References Cited

U.S. PATENT DOCUMENTS

2015/0363361 A1 12/2015 Kniazev
2015/0369609 A1 12/2015 Roumeliotis et al.
(Continued)

FOREIGN PATENT DOCUMENTS

CN 103105611 A 5/2013
CN 103455642 A 12/2013
(Continued)

OTHER PUBLICATIONS

Niko S..underhauf et al.Incremental Sensor Fusion in Factor Graphs with Unknown Delays, 2013. total 8 pages.
(Continued)

*Primary Examiner* — Matthew C Bella
*Assistant Examiner* — Dennis Rosario
(74) *Attorney, Agent, or Firm* — Womble Bond Dickinson (US) LLP

(57) ABSTRACT

The method includes: determining a reference sensor from at least two sensors and sampling moments of the reference sensor; when obtaining observation data of a sensor K at a moment $t_1$, determining a type of the sensor K; if the sensor K is a first sensor of a first type, determining a sampling moment $T_1$ that is closest to $t_1$ and an interpolation coefficient $\lambda_1$, and calculating first rotation data and first translation data that are at $T_1$, and a first covariance matrix; if the sensor K is a second sensor of a second type, determining two sampling moments $T_2$ and $T_3$ that are closest to $t_1$ and interpolation coefficients $\lambda_2$ and $\lambda_3$, and calculating second rotation data and second translation data that are of the
(Continued)

second sensor from $T_2$ to $T_3$, and a second covariance matrix; merging rotation data, translation data, and covariance matrices that are at the sampling moments.

14 Claims, 7 Drawing Sheets

(51) Int. Cl.
*G06F 17/16* (2006.01)
*G06V 10/75* (2022.01)

(58) Field of Classification Search
CPC .. G05D 1/0242; G05D 1/0251; G05D 1/0236; G05D 1/0255; G05D 1/0272; G05D 2201/0207; G05D 1/0094; Y10S 901/01; G06T 7/74; G06T 7/70; G06T 2207/10021; G06T 7/248; G06T 7/277; G06T 7/85; G06T 2207/30244; G06T 2207/20221; G01S 17/86; G01S 19/45; G01S 13/867; G01S 19/48; G01S 19/485; G01S 19/49; G01S 17/87; G01S 17/875; H04N 5/225; H04N 13/239; H04N 13/296; H04N 5/2258; B25J 9/1697; B25J 9/1694; B25J 19/02; G06K 9/6288; G06K 9/6289; G06K 9/629; G06K 9/6293; G06K 2009/6295; G01C 21/165; G01C 21/1652
See application file for complete search history.

(56) References Cited

U.S. PATENT DOCUMENTS

2018/0231985 A1* 8/2018 Sun .................. B64D 47/08
2019/0273909 A1* 9/2019 Ye .................... G01B 11/14

FOREIGN PATENT DOCUMENTS

| CN | 103455675 A | 12/2013 |
|---|---|---|
| CN | 103942447 A | 7/2014 |
| CN | 106597498 A | 4/2017 |
| WO | 2018128669 A1 | 7/2018 |

OTHER PUBLICATIONS

Vadim Indelman et al. Information fusion in navigation systems via factor graph based incremental smoothing. In: Robotics and Autonomous Systems (RAS), Vo.61, No. 8 (2013), pp. 721-738.

J. Zhang and S. Singh. "LOAM: Lidar Odometry and Mapping in Real-time", RSS 2014. total 9 pages.

R. Mur-Artal and J. Tardos "ORB-SLAM2: an Open-Source SLAM System for Monocular, Stereo and RGB-D Cameras", arXiv:1610.06475, 2017. total 9 pages.

* cited by examiner

SENSOR DATA PROCESSING METHOD AND APPARATUS

CROSS-REFERENCE TO RELATED APPLICATIONS

This application is a continuation of International Application No. PCT/CN2018/107049, filed on Sep. 21, 2018, which claims priority to Chinese Patent Application No. 201710870160.5, filed on Sep. 22, 2017. The disclosures of the aforementioned applications are hereby incorporated by reference in their entireties.

TECHNICAL FIELD

This application relates to the sensor application field, and in particular, to a sensor data processing method and apparatus.

BACKGROUND

Intelligent terminals such as self-driving cars and intelligent robots are new-type terminals that have received much attention in recent years. For an intelligent terminal such as a self-driving car, a sensor is equivalent to an eye of the intelligent terminal. For example, by using the sensor, the self-driving car can identify a road, a vehicle on a road, a pedestrian, an obstacle, a transportation infrastructure, and/or the like. Implementing positioning of an intelligent terminal by using a sensor is one of current technical issues of great concern. In addition, a development trend of the intelligent terminals indicates that implementing positioning of an intelligent terminal by using only one sensor is to face an increasing quantity of challenges. Therefore, how to implement positioning of an intelligent terminal by using a plurality of types of sensors becomes one of urgent technical problems that currently need to be resolved.

However, to implement positioning of an intelligent terminal by using a plurality of sensors, a problem of how to merge data collected by the plurality of sensors needs to be resolved. In other words, positioning of the intelligent terminal is implemented by merging the data collected by the plurality of sensors. In the prior art, a cubature kalman filter (CKF)-based method is used to implement nonlinear asynchronous multi-sensor data merging. In the prior-art data merging method, linearization processing can be performed only for a current moment, and therefore, merging needs to be performed strictly in an order of times at which sensors collect data. A data processing manner is fixed, and a scope of application is narrow. Moreover, linearization processing, in prior-art data merging, performed strictly in a chronological order further brings about gradual accumulation of errors, resulting in low positioning accuracy of an intelligent terminal and poor applicability.

SUMMARY

Embodiments of this application provide a sensor data processing method and apparatus, so as to improve operational flexibility in data merging for a plurality of sensors and improve sensor data processing efficiency, thereby improving positioning accuracy of an intelligent terminal and achieving high applicability.

A first aspect provides a sensor data processing method. The method includes: A reference sensor is determined from at least two sensors in a terminal, and sampling moments of the reference sensor are determined. When observation data of any sensor K is obtained at any moment $t_1$, a sensor type of the sensor K is determined. Herein, observation data of sensors of different types may be processed in different data processing manners, to determine data such as rotation data, translation data, and covariance matrices that are at the sampling moments of the reference sensor and with which the observation data of the sensors is aligned, and therefore, a data processing manner is more flexible. If the sensor K is a first sensor of a first type, a sampling moment $T_1$ that is closest to $t_1$ is determined from the sampling moments of the reference sensor, an interpolation coefficient $\lambda_1$ used when interpolation is performed at $T_1$ is determined based on a sampling interval of the first sensor and $t_1$, first rotation data and first translation data that are of the first sensor at $T_1$ are calculated based on $\lambda_1$ and the observation data of the first sensor, and a first covariance matrix corresponding to the first rotation data and the first translation data is calculated. Herein, observation data of a sensor includes a pose of a terminal obtained through measurement by the sensor at any moment, for example, a rotation matrix and a translation vector that are of the terminal in a coordinate system and that are obtained through measurement by the sensor at a sampling moment $t_j$. For example, a GPS sensor may be configured to collect a rotation matrix and a translation vector that are of a terminal at any sampling moment. Details are not described below again. It may be understood that a sensor of the first type herein is configured to collect rotation data and translation data that are of the sensor (or a terminal equipped with the sensor) at any sampling moment. The first sensor is merely an example of a sensor of the first type, and sensors of the first type include but are not limited to the first sensor. This is not limited herein.

If the sensor K is a second sensor of a second type, two sampling moments $T_2$ and $T_3$ that are closest to $t_1$ are determined from the sampling moments of the reference sensor, an interpolation coefficient $\lambda 2$ used when interpolation is performed at $T_2$ and an interpolation coefficient $\lambda_3$ used when interpolation is performed at $T_3$ are determined based on a sampling interval of the second sensor and $t_1$, second rotation data and second translation data that are of the second sensor from $T_2$ to $T_3$ are calculated based on $\lambda_2$, $\lambda_3$, and the observation data of the second sensor, and a second covariance matrix corresponding to the second rotation data and the second translation data is calculated. Herein, a sensor of the second type is configured to collect rotation data (for example, a rotation matrix) and translation data (for example, a translation vector) that are of a relative motion of the sensor between any two adjacent sampling moments. For example, a radar sensor or a visual sensor may be configured to collect a rotation matrix and a translation vector that are of a relative motion of a terminal between two adjacent sampling moments. It may be understood that the second sensor is merely an example of a sensor of the second type, and sensors of the second type include but are not limited to the second sensor. This is not limited herein.

In one embodiment of this application, after rotation data (for example, a rotation matrix), translation data (for example, a translation vector), and a covariance matrix that are of each sensor at a sampling moment of the reference sensor are obtained through calculation performed in a corresponding manner based on a type of the sensor, rotation data, translation data, and covariance matrices that are at the sampling moments of the reference sensor including $T_1$, $T_2$, and $T_3$ may be merged, to obtain pose estimates of the terminal at the sampling moments. The to-be-merged rotation data includes at least the first rotation data and/or the second rotation data, the to-be-merged translation data includes at least the first translation data and/or the second translation data, and the to-be-merged covariance matrices include at least the first covariance matrix and/or the second covariance matrix.

In one embodiment of this application, for problems such as asynchronous arrival of observation data of a plurality of sensors, in an implementation provided in this embodiment of this application, mathematical derivation and/or interpolation calculation may be performed on motion status data such as rotation data and translation data of the sensors in Euclidean space and group space based on motion perception, to convert the observation data of the sensors that arrives at a data merging center at different moments into observation data that is at a same moment, thereby implementing data merging of the observation data of the sensors at the same moment. Merging of the observation data of the plurality of sensors supports out-of-order input of the observation data of the plurality of sensors. Therefore, a data processing manner is flexible, map building accuracy is higher, and applicability is higher. A process of collecting, by using the plurality of sensors, rotation data and translation data that are of the terminal when the terminal is located at different locations at different moments, and implementing terminal pose estimation based on the rotation data and the translation data that are of the terminal at the different locations may be understood as motion perception-based terminal pose estimation.

In a possible implementation, in one embodiment of this application, a closest adjacent sampling moment $t_2$ that is before $t_1$ may be determined based on the sampling interval of the first sensor, and the interpolation coefficient $\lambda_1$ used when interpolation is performed at $T_1$ may be calculated based on $t_1$ and $t_2$, where
$\lambda_1$ satisfies:

$$\lambda_1 = \frac{(T_1 - t_2)}{(t_1 - t_2)}.$$

In a possible embodiment, the observation data of the first sensor includes a rotation matrix and a translation vector that are of the first sensor; and the calculating, based on $\lambda_1$ and the observation data of the first sensor, first rotation data and first translation data that are of the first sensor at $T_1$ includes: obtaining a rotation matrix $_G^1R$ and a translation vector $^Gp_1$ that are of the first sensor at $t_1$, and a rotation matrix $_G^2R$ and a translation vector $^Gp_2$ that are of the first sensor at $t_2$; and calculating, based on $\lambda_1$, $_G^1R$, $^Gp_1$, $_G^2R$, and $^Gp_2$ a first rotation matrix $_G^{T1}R$ and a first translation vector $_Gp_{T1}$ that are of the first sensor at $T_1$, where
$_G^{T1}R$ satisfies:

$_G^T{}_1R = \mathrm{Exp}(\lambda_1 \lfloor \mathrm{Log}\, v(_G^1R_G^2R^T) \rfloor) \times _G^2R$; and $^Gp_{T1}$ satisfies:

$^Gp_{T1} = (1-\lambda_1)_Gp_2 + \lambda_1{}^Gp_1$, where the first rotation matrix $_G^{T1}R$ is the first rotation data, and the first translation vector $^Gp_{T1}$ is the first translation data. $\{_G^{T1}R, {}^Gp_{T1}\}$ represents a pose of the first sensor at $T_1$ in a global coordinate system, G represents the global coordinate system, $\{_G^1R, {}^Gp_1\}$ represents a pose of the first sensor at $t_1$ in the global coordinate system, and $\{_G^2R, {}^Gp_2\}$ represents a pose of the first sensor at $t_2$ in the global coordinate system. In this embodiment of this application, during alignment of observation data of a plurality of sensors, observation data input by a sensor of the first type at a moment adjacent to an alignment moment may be converted into observation data that is at the alignment moment, in a manner such as interpolation calculation and/or mathematical derivation corresponding to a unary pose calculation manner. Then, in a data merging phase, only observation data at the sampling moments of the reference sensor needs to be merged, to implement merging of the observation data of the plurality of sensors. Asynchronous arrival of the observation data of the plurality of sensors can be supported. Operations are simple, and data processing efficiency is high.

In a possible implementation, in one embodiment of this application, a covariance matrix $P_{t1}$ corresponding to a pose that is of the first sensor at $t_1$ may be calculated, and a covariance matrix $P_{t2}$ corresponding to a pose that is of the first sensor at $t_2$ may be calculated; a Jacobian matrix $H_u$ is calculated based on the first rotation matrix and the first translation vector, and a covariance matrix $P_{T1}$ corresponding to the first rotation matrix and the first translation vector is calculated based on $P_{t1}$ and $P_{t2}$, where Hu satisfies:

$$H_u = \begin{bmatrix} -\tfrac{i}{2}\hat{R}(J_r(\lambda \mathrm{Log}v(\tfrac{1}{2}\hat{R}))) & & \tfrac{i}{2}\hat{R}(J_r(-\lambda \mathrm{Log}v(\tfrac{1}{2}\hat{R}^T))) & \\ & 0_{3\times 3} & & 0_{3\times 3} \\ \lambda J_r^{-1}(\mathrm{Log}v(\tfrac{1}{2}\hat{R})) - I & & \lambda J_r^{-1}(\mathrm{Log}v(\tfrac{1}{2}\hat{R}^T))) & \\ 0_{3\times 3} & (1-\lambda)I & 0_{3\times 3} & \lambda I \end{bmatrix};$$

and
$P_{T1}$ satisfied:

$$P_i = H_u P_{1,2} H_u^T = \begin{bmatrix} \frac{\delta_G^i \tilde{\theta}}{\delta_G^2 \tilde{\theta}} & 0_{3\times 3} & \frac{\delta_G^i \tilde{\theta}}{\delta_G^1 \tilde{\theta}} & 0_{3\times 3} \\ 0_{3\times 3} & \frac{\delta^G \tilde{p}_i}{\delta^G \tilde{p}_2} & 0_{3\times 3} & \frac{\delta^G \tilde{p}_i}{\delta^G \tilde{p}_1} \end{bmatrix} \begin{bmatrix} P_{t1} & 0_{6\times 6} \\ 0_{6\times 6} & P_{t2} \end{bmatrix}$$

$$\begin{bmatrix} \frac{\delta_G^i \tilde{\theta}}{\delta_G^2 \tilde{\theta}} & 0_{3\times 3} & \frac{\delta_G^i \tilde{\theta}}{\delta_G^1 \tilde{\theta}} & 0_{3\times 3} \\ 0_{3\times 3} & \frac{\delta^G \tilde{p}_i}{\delta^G \tilde{p}_2} & 0_{3\times 3} & \frac{\delta^G \tilde{p}_i}{\delta^G \tilde{p}_1} \end{bmatrix}^T,$$

where
$P_{1,2}$ represents $P_{t1}$ and $P_{t2}$, $\hat{R}$ represents an estimate of a rotation matrix R, $O_{3\times 3}$ represents a 3×3 all-zero matrix, $O_{6\times 6}$ represents a 6×6 all-zero matrix, I represents an identity matrix, i represents $T_1$, G represents the global coordinate system, $\lambda$ represents the interpolation coefficient $\lambda_1$, Jr represents a right Jacobian matrix, Log v represents a logarithmic operation of a matrix, and $\tilde{\theta}$ and $\tilde{p}$ represent an angle error vector and a displacement error vector, respectively. In this embodiment of this application, a covariance matrix corresponding to a pose that is of each sensor at a sampling moment of the reference sensor may be calculated, thereby improving accuracy of obtaining a pose estimate of the terminal through data merging for a plurality of sensors, and achieving higher applicability.

In a possible embodiment, corresponding to processing of observation data of a sensor of the second type, in this embodiment of this application, during the determining, based on a sampling interval of the second sensor and $t_1$, an interpolation coefficient $\lambda_2$ used when interpolation is performed at $T_2$ and an interpolation coefficient $\lambda_3$ used when interpolation is performed at $T_3$, the following operations may be specifically performed: determining, based on the sampling interval of the second sensor and $t_1$, a closest adjacent sampling moment $t_2$ that is before $t_1$, and determining, based on $t_1$ and $t_2$, the interpolation coefficient $\lambda_2$ used when interpolation is performed at $T_2$ and the interpolation coefficient $\lambda_3$ used when interpolation is performed at $T_3$, where $\lambda_2$ satisfies:

$$\lambda_2 = \frac{(T_2 - t_1)}{(t_1 - t_2)};$$

$\lambda_3$ satisfies:

$$\lambda_3 = \frac{(t_2 - T_3)}{(t_1 - t_2)},$$

where $T_2$ represents a sampling moment closest to $t_1$ among the sampling moments of the reference sensor, and $T_3$ represents a sampling moment closest to $t_2$ among the sampling moments of the reference sensor.

In a possible embodiment, the observation data of the second sensor provided in this embodiment of this application may include a rotation matrix and a translation vector that are of $\lambda_2$, $\lambda_3$, and the observation data of the second sensor, second rotation data and second translation data that are of the second sensor from $T_2$ to $T_3$, the following operations may be performed: obtaining a rotation matrix $_2^1R$ of the second sensor between $t_1$ and $t_2$ and a translation vector $^2p_1$ of the second sensor between $t_1$ and $t_2$; and calculating, based on $\lambda_2$, $\lambda_3$, $_2^1R$, and $^2p_1$, a second rotation matrix $_{T3}{}^{T2}R$ and a second translation vector $^{T3}p_{T2}$ that are of a relative motion of the second sensor between $T_2$ and $T_3$, where $_{T3}{}^{T2}R$ satisfies:

$_{T3}{}^{T2}R = \text{Exp } v[(1+\lambda_3+\lambda_2)\text{Log } v(_2^1R)]$; and $^{T3}p_{T2}$ satisfies:

$^{T3}p_{T2} = (1+\lambda_3\lambda_2)\text{Exp } v[-\lambda_3 \text{ Log } v(_2^1R)]^2p_1$, where the second rotation matrix $_{T3}{}^{T2}R$ is the second rotation data, and the second translation vector $^{T3}p_{T2}$ is the second translation data.

In a possible implementation, in one embodiment of this application, a covariance matrix $P_{t12}$ corresponding to the rotation matrix and the translation vector that are of the second sensor between $t_1$ and $t_2$ may be further calculated; a Jacobian matrix Hu is calculated based on the second rotation matrix and the second translation vector, and a covariance matrix $P_{T12}$ corresponding to the second rotation matrix and the second translation vector is calculated based on $P_{t12}$, where $H_u$ satisfies:

and $P_{T12}$ satisfies:

$$P_{T12} = H_u P_{t12} H_u^T = \begin{bmatrix} \frac{\delta_b^e \tilde{\theta}}{\delta_2^1 \tilde{\theta}} & O_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix} P_{t12} \begin{bmatrix} \frac{\delta_b^e \tilde{\theta}}{\delta_2^1 \tilde{\theta}} & O_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix}^T,$$

where $\hat{R}$ represents an estimate of a rotation matrix R, $O_{3\times 3}$ represents a 3×3 all-zero matrix, b represents $T_3$, e represents $T_2$, $\lambda_b$ represents the interpolation coefficient $\lambda_3$, $\lambda_e$ represents the interpolation coefficient $\lambda_2$, Jr represents a right Jacobian matrix, Log v represents a logarithmic operation of a matrix, and $\tilde{\theta}$ and $\tilde{p}$ represent an angle error vector and a displacement error vector, respectively.

In one embodiment of this application, during alignment of observation data of a plurality of sensors, observation data input by a sensor of the second type at a moment adjacent to an alignment moment may be converted into observation data that is at the alignment moment, in a manner such as interpolation calculation and mathematical derivation corresponding to a binary pose calculation manner. Then, in a data merging phase, only observation data at the sampling moments of the reference sensor needs to be merged, to implement merging of the observation data of the plurality of sensors. Asynchronous arrival of the observation data of the plurality of sensors can be supported. Operations are more flexible, and data processing efficiency is higher.

In a possible implementation, in one embodiment of this application, a verification map may be further built in the global coordinate system based on rotation matrices and translation vectors that are at the sampling moments of the reference sensor including $T_1$, $T_2$, and/or $T_3$, and based on the pose estimates of the terminal at the sampling moments, where the verification map may be used to provide reference data for determining an online pose estimate of the terminal.

In one embodiment of this application, rotation data and translation data that are input by the sensors and/or covariance matrices may be converted, based on types of the sensors, into data that is at corresponding alignment moments, rotation data, translation data, and/or covariance matrices that are at the alignment moments may be merged, and then optimization may be performed, to output the verification map in the global coordinate system. The verification map can help implement online pose estimation of the terminal when there is no input from a GPS sensor. In this embodiment of this application, merging of the observation data of the plurality of sensors supports out-of-order input of the observation data of the plurality of sensors. Therefore, a data processing manner is flexible, map building accuracy is higher, and applicability is higher.

$$H_u = \begin{bmatrix} J_r\left[(1+\lambda_b+\lambda_s)\text{Log}v\left(\tfrac{1}{2}\hat{R}^T\right)\right](1+\lambda_b+\lambda_s)J_r^{-1}\left[\text{Log}v\left(\tfrac{1}{2}\hat{R}^T\right)\right] & O_{3\times 3} \\ \left(-(1+\lambda_b+\lambda_s)\text{Exp}v\left[\lambda_b\text{Log}v\left(\tfrac{1}{2}\hat{R}^T\right)\right]\right) & \\ L^2\hat{p}_1 \times J_r\left(\lambda_b\text{Log}v\left(\tfrac{1}{2}\hat{R}^T\right)\lambda_b J_r^{-1}\left(\text{Log}v\left(\tfrac{1}{2}\hat{R}^T\right)\right) & (1+\lambda_b+\lambda_s)\text{Exp}v\left[-\lambda_b\text{Log}v\left(\tfrac{1}{2}\hat{R}\right)\right] \end{bmatrix};$$

In a possible implementation, in one embodiment of this application, an online positioning function of the terminal may be further enabled, and the verification map of the terminal may be obtained; when observation data of any sensor L is obtained at any moment $t_3$, a sensor type of the sensor L is determined; if the sensor L is a third sensor of the first type, a sampling moment $T_4$ that is closest to $t_3$ is determined from the sampling moments of the reference sensor, and fourth rotation data and fourth translation data that are of the third sensor at $T_4$ and a fourth covariance matrix corresponding to the fourth rotation data and the fourth translation data are calculated; if the sensor L is a fourth sensor of the second type, the following operation a and operation b are performed:

a: matching observation data of the fourth sensor at $t_3$ with the verification map, to determine reference rotation data and reference translation data that are of the fourth sensor at $t_3$; and determining, from the sampling moments of the reference sensor, a sampling moment $T_4$ that is closest to $t_3$, and calculating, based on the reference rotation data and the reference translation data that are of the fourth sensor at $t_3$, fifth rotation data and fifth translation data that are of the fourth sensor at $T_4$ and a fifth covariance matrix corresponding to the fifth rotation data and the fifth translation data; and b: determining, from the sampling moments of the reference sensor, two sampling moments $T_5$ and $T_6$ that are closest to $t_3$, determining, based on a sampling interval of the fourth sensor and $t_3$, an interpolation coefficient $\lambda_5$ used when interpolation is performed at $T_5$ and an interpolation coefficient $\lambda_6$ used when interpolation is performed at $T_6$, calculating, based on $\lambda_5$, $\lambda_6$, and the observation data of the fourth sensor, sixth rotation data and sixth translation data that are of the fourth sensor from $T_5$ to $T_6$, and calculating a sixth covariance matrix corresponding to the sixth rotation data and the sixth translation data; and rotation data, translation data, and covariances matrices that are at the sampling moments of the reference sensor including $T_4$, $T_5$, and $T_6$ are merged, to obtain the online pose estimate of the terminal, where the to-be-merged rotation data includes at least the fourth rotation data, the fifth rotation data, or the sixth rotation data, the to-be-merged translation data includes at least the fourth translation data, the fifth translation data, or the sixth translation data, and the to-be-merged covariance matrices include at least the fourth covariance matrix, the fifth covariance matrix, or the sixth covariance matrix.

In one embodiment of this application, the observation data of the sensors may be matched with the verification map, observation data obtained through the matching may be merged with observation data that is collected by the sensors in real time, incremental smooth iterative optimization may be performed on a merging result of the observation data of the plurality of sensors, and finally, an online pose estimate of the current terminal may be obtained in real time. Operations are easy, precision of online pose estimation is high, and applicability is higher.

In a possible embodiment, a sensor of the first type including the first sensor and/or the third sensor is configured to collect rotation data and translation data that are of the sensor of the first type at any sampling moment of the sensor of the first type. For example, a global positioning system (GPS) sensor may be configured to collect a rotation matrix and a translation vector that are of a terminal at any sampling moment.

In a possible implementation, a sensor of the second type including the second sensor and/or the fourth sensor is configured to collect rotation data and translation data that are of a relative motion of the sensor of the second type between any two adjacent sampling moments of the sensor of the second type. For example, a radar sensor or a visual sensor may be configured to collect a rotation matrix and a translation vector that are of a relative motion of a terminal between two adjacent sampling moments.

In a possible embodiment, a pose provided in this embodiment of this application includes a location and a posture. The location refers to translation in three directions of x, y, and z in a coordinate system, and the posture refers to rotation in the three directions of x, y, and z in the coordinate system. A pose may be represented by translation vectors in three directions of x, y, and z in a specified coordinate system and rotation matrices in the three directions of x, y, and z in the specified coordinate system.

Observation data of a sensor includes a pose, of a terminal, obtained through measurement by the sensor at any moment, for example, a rotation matrix and a translation vector that are of the terminal in a coordinate system and that are obtained through measurement by the sensor at a sampling moment $t_1$.

Data alignment of sensors is a process of converting observation data of different sensors under different time references into observation data of the different sensors under a same time reference. Observation by different sensors at a same moment belongs to observation under a same time reference, and in this case, observation data of the different sensors belongs to observation data under the same time reference. Observation by different sensors at different moments belongs to observation under different time references, and in this case, observation data of the different sensors belongs to observation data under the different time references. A same time reference may be understood as same sampling frequency, a same sampling period, or the like. The sampling frequency or the sampling period may be understood as sampling frequency or a sampling period of a reference sensor. Observation by different sensors at a same moment may be understood as observation performed at a same sampling moment by sensors with same sampling frequency, and observation by different sensors at different moments may be understood as observation performed at different moments by sensors with different sampling frequency.

A second aspect provides a sensor data processing method. The method includes: determining a reference sensor from at least two sensors in a terminal, and determining sampling moments of the reference sensor; when obtaining observation data of any sensor K at any moment $t_1$, determining a sensor type of the sensor K; if the sensor K is a first sensor of a first type, determining, from the sampling moments of the reference sensor, a sampling moment $T_1$ that is closest to $t_1$, obtaining a sampling moment $t_2$ of the first sensor that is before $t_1$ and observation data corresponding to $t_2$, determining, based on $t_1$ and $t_2$, an interpolation coefficient $\lambda_1$ used when interpolation is performed at $T_1$, calculating, based on $\lambda_1$ and the observation data of the first sensor at $t_1$ and $t_2$, first rotation data and first translation data that are of the first sensor at $T_1$, and calculating a first covariance matrix corresponding to the first rotation data and the first translation data; if the sensor K is a second sensor of a second type, determining, from the sampling moments of the reference sensor, a sampling moment T2 that is closest to $t_1$, and obtaining a sampling moment $t_2$ of the second sensor that is before $t_1$ and observation data corresponding to $t_2$; determining, from the sampling moments of the reference sensor, a sampling moment $T_3$ that is closest to $t_2$, determining, based on $t_2$ and $t_1$, an interpolation coefficient $\lambda_2$ used when interpolation is performed at $T_2$ and an interpolation coefficient $\lambda_3$ used when interpolation is performed at $T_3$, calculating, based on $\lambda_2$, $\lambda_3$, and the observation data of the second sensor, second rotation data and second translation data that are of the second sensor from $T_2$ to $T_3$, and calculating a second covariance matrix corresponding to the second rotation data and the second translation data; and merging rotation data, translation data, and covariance matrices that are at the sampling moments of the reference sensor including $T_1$, $T_2$, and $T_3$, to obtain pose estimates of the terminal at the sampling moments, where the to-be-merged rotation data includes at least the first rotation data and/or the second rotation data, the to-be-merged translation data includes at least the first translation data and/or the second translation data, and the to-be-merged covariance matrices include at least the first covariance matrix and/or the second covariance matrix.

In a possible implementation, in one embodiment of this application, an online positioning function of the terminal may be further enabled, and a verification map of the terminal may be obtained; when observation data of any sensor L is obtained at any moment $t_3$, a sensor type of the sensor L is determined; if the sensor L is a third sensor of the first type, a sampling moment $T_4$ that is closest to $t_3$ is determined from the sampling moments of the reference sensor, a sampling moment $t_4$ of the third sensor that is before $t_3$ and observation data corresponding to $t_4$ are obtained, an interpolation coefficient used when interpolation is performed at $T_4$ is determined based on $t_3$ and $t_4$, and fourth rotation data and fourth translation data that are of the third sensor at $T_4$ and a fourth covariance matrix corresponding to the fourth rotation data and the fourth translation data are calculated based on the interpolation coefficient and the observation data of the third sensor at $t_3$ and $t_4$; if the sensor L is a fourth sensor of the second type, the following operation a and operation b are performed:

a: matching observation data of the fourth sensor at $t_3$ with the verification map, to determine reference rotation data and reference translation data that are of the fourth sensor at $t_3$; and determining, from the sampling moments of the reference sensor, a sampling moment $T_4$ that is closest to $t_3$, and calculating, based on the reference rotation data and the reference translation data that are of the fourth sensor at $t_3$, fifth rotation data and fifth translation data that are of the fourth sensor at $T_4$ and a fifth covariance matrix corresponding to the fifth rotation data and the fifth translation data; and b: determining, from the sampling moments of the reference sensor, a sampling moment $T_5$ that is closest to $t_3$, and obtaining a sampling moment $t_4$ of the fourth sensor that is before $t_3$ and observation data corresponding to $t_4$; determining, from the sampling moments of the reference sensor, a sampling moment $T_6$ that is closest to $t_4$; determining, based on $t_3$ and $t_4$, an interpolation coefficient $\lambda_5$ $\lambda_6$ used when interpolation is performed at $T_6$; and calculating, based on $\lambda_5$, $\lambda_6$, and the observation data of the fourth sensor at $t_3$ and $t_4$, sixth rotation data and sixth translation data that are of the fourth sensor from $T_5$ to $T_6$, and calculating a sixth covariance matrix corresponding to the sixth rotation data and the sixth translation data; and rotation data, translation data, and covariance matrices that are at the sampling moments of the reference sensor including $T_4$, $T_5$, and $T_6$ are merged, to obtain an online pose estimate of the terminal, where the to-be-merged rotation data includes at least the fourth rotation data, the fifth rotation data, or the sixth rotation data, the to-be-merged translation data includes at least the fourth translation data, the fifth translation data, or the sixth translation data, and the to-be-merged covariance matrices include at least the fourth covariance matrix, the fifth covariance matrix, or the sixth covariance matrix.

In one embodiment of this application, a data merging center may match the observation data of the sensors with the verification map; merge observation data obtained through the matching, with observation data that is collected by the sensors in real time; perform incremental smooth iterative optimization on a merging result of the observation data of the plurality of sensors; and finally obtain an online pose estimate of the current terminal in real time. Operations are easy, precision of online pose estimation is high, and applicability is higher.

A third aspect provides a sensor data processing apparatus. The apparatus includes units and/or modules configured to perform the sensor data processing method provided in the first aspect and/or any possible implementation of the first aspect, and therefore can also implement beneficial effects (or advantages) of the sensor data processing method provided in the first aspect.

A fourth aspect provides a terminal. The terminal includes a memory, a processor, a receiver, and a transmitter. The processor is configured to invoke sensor data processing program code stored in the memory, to perform the sensor data processing method provided in the first aspect and/or any possible implementation of the first aspect.

An embodiment of this application provides a computer storage medium, configured to store a computer software instruction required for the sensor data processing method provided in the first aspect, where the instruction includes a program required by a terminal for performing an implementation designed in the first aspect.

An embodiment of this application further provides a chip. The chip is coupled to a receiver and/or a transmitter in a terminal, and is configured to perform technical solutions provided in the first aspect of the embodiments of this application. It should be understood that "coupled" in the embodiments of this application means that two components are combined directly or indirectly with each other. Such combination may be fixed or mobile. Such combination may allow communication of a fluid, electricity, an electrical signal, or a signal of another type between the two components.

According to the embodiments of this application, operational flexibility in data merging for a plurality of sensors and sensor data processing efficiency can be improved, thereby improving positioning accuracy of an intelligent terminal and achieving high applicability.

DESCRIPTION OF EMBODIMENTS

Figure 1:
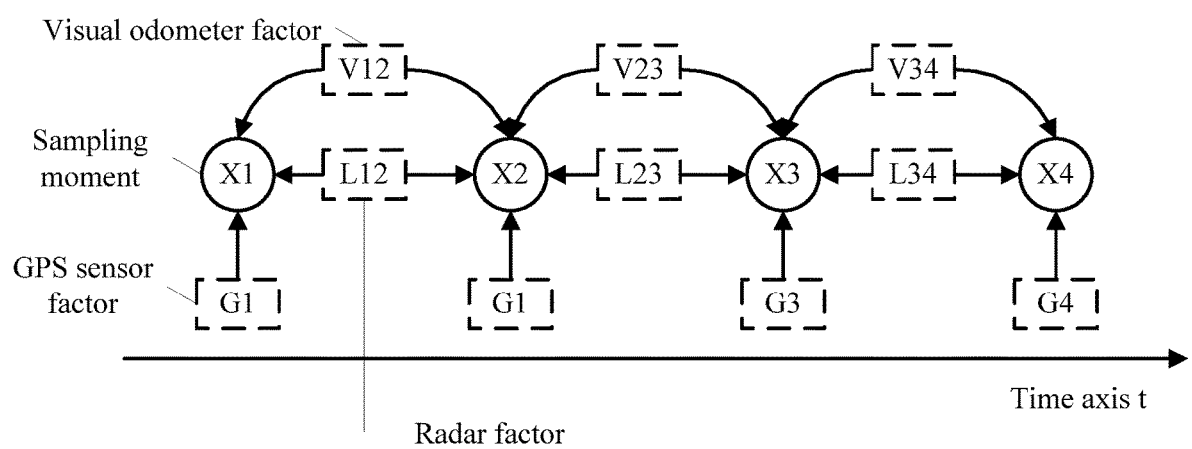
FIG. 1 is a schematic diagram of multi-sensor observation of terminal pose estimation according to an embodiment of this application.

For ease of understanding various possible implementations of a sensor data processing method provided in embodiments of this application, the following describes a meaning of each parameter provided in the embodiments of this application.

A pose includes a location and a posture. The location refers to translation in three directions of x, y, and z in a coordinate system, and the posture refers to rotation in the three directions of x, y, and z in the coordinate system. A pose may be represented by translation vectors in three directions of x, y, and z in a specified coordinate system and rotation matrices in the three directions of x, y, and z in the specified coordinate system. For ease of description, in the following descriptions, an example in which a pose is represented by a rotation matrix and a translation vector is used for description, and the rotation matrix and the translation vector are by default a rotation matrix and a translation vector that are in a same coordinate system.

Observation data of a sensor includes a pose of a terminal obtained through measurement by the sensor at any moment, for example, a rotation matrix and a translation vector that are of the terminal in a coordinate system and that are obtained through measurement by the sensor at a sampling moment $t_1$.

Data alignment of sensors is a process of converting observation data of different sensors under different time references into observation data of the different sensors under a same time reference. Observation by different sensors at a same moment belongs to observation under a same time reference, and in this case, observation data of the different sensors belongs to observation data under the same time reference. Observation by different sensors at different moments belongs to observation under different time references, and in this case, observation data of the different sensors belongs to observation data under the different time references. A same time reference may be understood as same sampling frequency, a same sampling period, or the like. The sampling frequency or the sampling period may be understood as sampling frequency or a sampling period of a reference sensor. Observation by different sensors at a same moment may be understood as observation performed at a same sampling moment by sensors with same sampling frequency, and observation by different sensors at different moments may be understood as observation performed at different moments by sensors with different sampling frequency.

A graph is a structure including a vertex and an edge, for example, a factor graph provided in an embodiment of this application. The vertex may represent an ordinary point, or the vertex may represent an observation time node of a sensor, that is, a sampling moment of observation data of the sensor.

For a unary edge and/or a binary edge, the unary edge is an edge connected to one vertex. In a graph, one edge is connected to one or more vertices, and an edge may be used to represent a relationship between vertices. An edge connected to one vertex is a unary edge, and an edge connected to two vertices is a binary edge.

Unary pose observation is analogous to a unary edge, and unary pose observation is observation of a pose of a terminal at any sampling moment. A unary pose may be understood as a pose that can be determined based on data collected at a single sampling moment, or may be understood as a pose that can be determined based on one frame of data, including a rotation matrix and a translation vector. A sensor corresponding to unary pose observation may be referred to as a sensor of a first type. A sensor of the first type is configured to collect a rotation matrix and a translation vector that are of the sensor (or a terminal equipped with the sensor) at any sampling moment. For example, a global positioning system (GPS) sensor may be configured to collect a rotation matrix and a translation vector that are of a terminal at any sampling moment.

Binary pose observation is analogous to a binary edge, and binary pose observation is observation of a pose of a terminal at any two adjacent sampling moments. A binary pose may be understood as a pose that needs to be determined based on data collected at at least two sampling moments, or may be understood as a pose that needs to be determined based on at least two frames of data, including a rotation matrix and a translation vector. A sensor corresponding to binary pose observation may be referred to as a sensor of a second type. A sensor of the second type is configured to collect a rotation matrix and a translation vector that are of a relative motion of the sensor between any two adjacent sampling moments. For example, a radar sensor or a visual sensor may be configured to collect a rotation matrix and a translation vector that are of a relative motion of a terminal between two adjacent sampling moments.

Lie algebra is a class of important non-associative algebra. The Lie algebra is a mathematical concept introduced by the Norwegian mathematician Sophus Lie in the study of a continuous transformation group in the late nineteenth century. The Lie algebra is closely related to research of a Lie group. The Lie algebra is not only a tool for linearization of group theory problems but also a source of many important problems in finite group theory and linear algebra.

A Lie group is a group of a differentiable manifold and can solve a rotary motion of a rigid body.

For group space, group space provided in the embodiments of this application is space corresponding to a Lie group.

For Euclidean space, space corresponding to Euclidean geometry is Euclidean space. Euclidean geometry is a law of a connection between an angle and a distance in space, established by the ancient Greek mathematician Euclid. Space corresponding to Euclidean geometry is Euclidean space.

A sensor data processing method provided in the embodiments of this application is applicable to map building of a terminal and positioning of the terminal. The terminal may be an apparatus such as a self-driving car, an intelligent robot, an unmanned aerial vehicle, a tablet computer, a personal digital assistant (PDA), a mobile internet device (MID), a wearable device, or an ebook reader. The terminal may be alternatively a portable, pocket-sized, handheld, computer built-in, or vehicle-mounted mobile apparatus. This is not limited herein. For ease of description, in the following descriptions, the foregoing apparatus is described by using a terminal as an example.

Map building and/or positioning of a terminal means implementing pose estimation of the terminal based on merging of observation data of a plurality of sensors. Pose estimation of the terminal may include estimation of a rotation matrix and a translation vector that are of a relative motion of the terminal between two time nodes (for example, two adjacent sampling moments of a sensor of the second type), and/or estimation of a rotation matrix and a translation vector that are of the terminal at a current time node (for example, a sampling moment of a sensor of the first type).

An optimization method based on a smoothing manner is one of main research methods used in current map building and/or positioning. The optimization method based on the smoothing manner, for example, a nonlinear least squares optimization method including g2o and isam, may use a global optimization or overall consideration processing manner to obtain a better map building effect. Therefore, the optimization method based on the smoothing manner is also referred to as a main research method of map building and/or positioning in a large-scale environment.

A terminal provided in the embodiments of this application may estimate a pose of the terminal based on the smoothing manner by using a plurality of sensors with which the terminal is equipped, merge observation data of the plurality of sensors, and perform optimization processing on a merging result of the observation data of the plurality of sensors to output a positioning map of the terminal, an online pose estimate of the terminal, or the like. The following describes the sensor data processing method and apparatus provided in the embodiments of this application with reference to FIG. 1 to FIG. 9.

FIG. 1 is a schematic diagram of multi-sensor observation of terminal pose estimation according to an embodiment of this application. Modeling may be first performed in a manner of a factor graph for multi-sensor data merging provided in this embodiment of this application. The factor graph is used to represent a change in a motion status of a terminal. As shown in FIG. 1, as the motion status of the terminal changes, circles indicate different locations at which the terminal is located at different moments. Rotation matrices and translation vectors that are of the terminal at the locations indicated by the circles are poses of the terminal at the locations. A factor graph shown in FIG. 1 may be used to represent observation by different sensors under a same time reference. In other words, the factor graph shown in FIG. 1 may be alternatively a schematic diagram of a data relationship formed after observation data of the sensors is aligned on a time axis. For example, it is assumed that a plurality of sensors with which the terminal is equipped include a GPS sensor, a radar, a visual odometer, and the like. In FIG. 1, X1, X2, X3, and X4 represent four consecutive sampling moments of a reference sensor, and G, V, and L represent factors corresponding to the GPS sensor, the visual odometer, and the radar, respectively. A factor corresponding to the GPS sensor is a unary edge factor (for example, G1, G2, G3, and G4). In other words, the GPS sensor may be a sensor of a first type. Factors corresponding to the visual odometer and the radar are binary edge factors, for example, V12, V23, and V34, and L12, L23, and L34. The radar and the visual odometer may be sensors of a second type.

A process of collecting, by using a plurality of sensors, rotation matrices and translation vectors that are of a terminal when the terminal is located at different locations at different moments, and implementing terminal pose estimation based on the rotation matrices and the translation vectors that are of the terminal at the different locations may be understood as motion perception-based terminal pose estimation. In the embodiments of this application, functions of map building and terminal positioning (also referred to as determining an online pose estimate of a terminal) can be implemented based on motion perception-based terminal pose estimation.

Embodiment 1

This embodiment of this application provides a possible implementation of implementing map building by merging observation data of a plurality of sensors. It may be understood that different sensors have different sampling frequency, and observation data of different sensors also has different time delays when being transported to a data merging center. Therefore, in a process of merging the observation data of the plurality of sensors, there is a problem that the observation data of the plurality of sensors arrives asynchronously. Asynchronous arrival of observation data means that observation data of different sensors arrives at the data merging center at different moments. The data merging center may be a module, in a terminal, configured to implement functions such as merging observation data of a plurality of sensors. This is not limited herein, and details are not described below again.

For problems such as asynchronous arrival of the observation data of the plurality of sensors, in the implementation provided in this embodiment of this application, mathematical derivation and/or interpolation calculation may be performed on motion status data such as rotation matrices and translation vectors of the sensors in Euclidean space and group space based on motion perception, to convert the observation data of the sensors that arrives at the data merging center at different moments into observation data that is at a same moment, thereby implementing data merging of the observation data of the sensors at the same moment.

In one embodiment of this application, the observation data of the sensors under a same time reference may be merged, a merging result of the observation data of the plurality of sensors may be globally optimized, and a global 3D map (map) may be output. In this embodiment of this application, merging of the observation data of the plurality of sensors supports out-of-order input of the observation data of the plurality of sensors. Therefore, a data processing manner is flexible, map building accuracy is higher, and applicability is higher.

Figure 2:
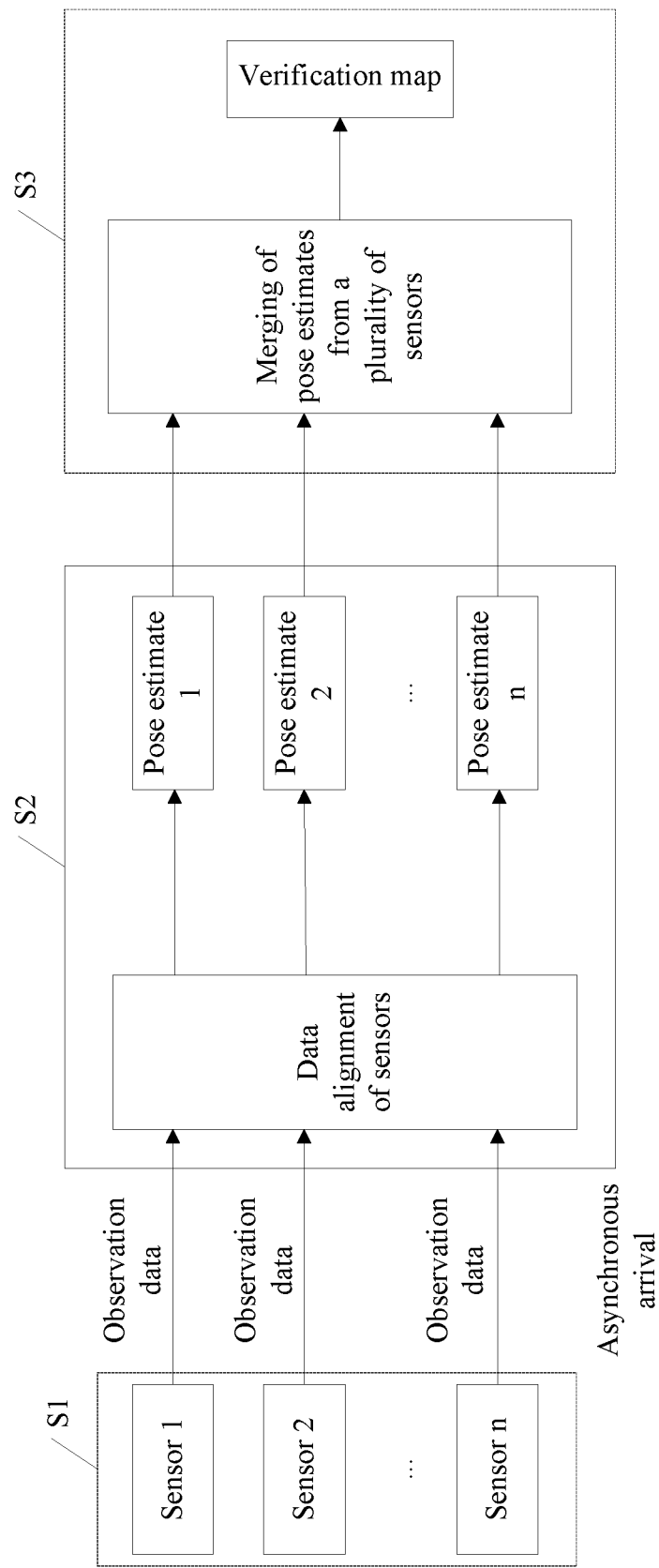
FIG. 2 is a schematic diagram of a map building manner based on multi-sensor data merging according to an embodiment of this application.

FIG. 2 is a schematic diagram of a map building manner based on multi-sensor data merging according to an embodiment of this application. The map building manner shown in FIG. 2 mainly includes three data processing processes of S1, S2, and S3.

S1 indicates input of observation data of a plurality of sensors, including input of data of a sensor 1, a sensor 2, ..., and a sensor n. Observation data of different sensors may be input into a data merging center at different time nodes (for example, different moments). In other words, the data merging center supports asynchronous arrival of the observation data of the plurality of sensors.

S2 indicates data alignment of the plurality of sensors, that is, converting the observation data of the different sensors under different time references into observation data of the different sensors under a same time reference. A process of data alignment of the plurality of sensors may also be referred to as sensor alignment. It may be understood that because different sensors have different sampling frequency, collection moments at which the different sensors collect observation data used for determining a pose of a terminal are different. Therefore, observation data of different sensors that is input into the data merging center at different moments belongs to observation data under different time references. The data merging center may perform mathematical derivation and/or interpolation calculation on rotation matrices and translation vectors of the sensors in Euclidean space and group space, to convert observation data of the sensors that arrives at the data merging center at different moments into observation data that is at a same moment, thereby converting the observation data that is of the different sensors under different time references into observation data that is under a same time reference. Then, under the same time reference, observation data of each sensor may represent a pose estimate of the terminal. For example, under the same time reference, observation data of the sensor 1, the sensor 2, . . . , and the sensor n may represent n pose estimates of the terminal, including a pose estimate 1, a pose estimate 2, . . . , and a pose estimate n, respectively.

S3 indicates that after data alignment of the sensors is completed, observation data of all the sensors is merged, global optimization is performed on data obtained through the merging, and finally a global 3D map may be output. Global optimization may use a nonlinear least squares optimization method that is based on a smoothing manner, for example, g2o.

Figure 3:
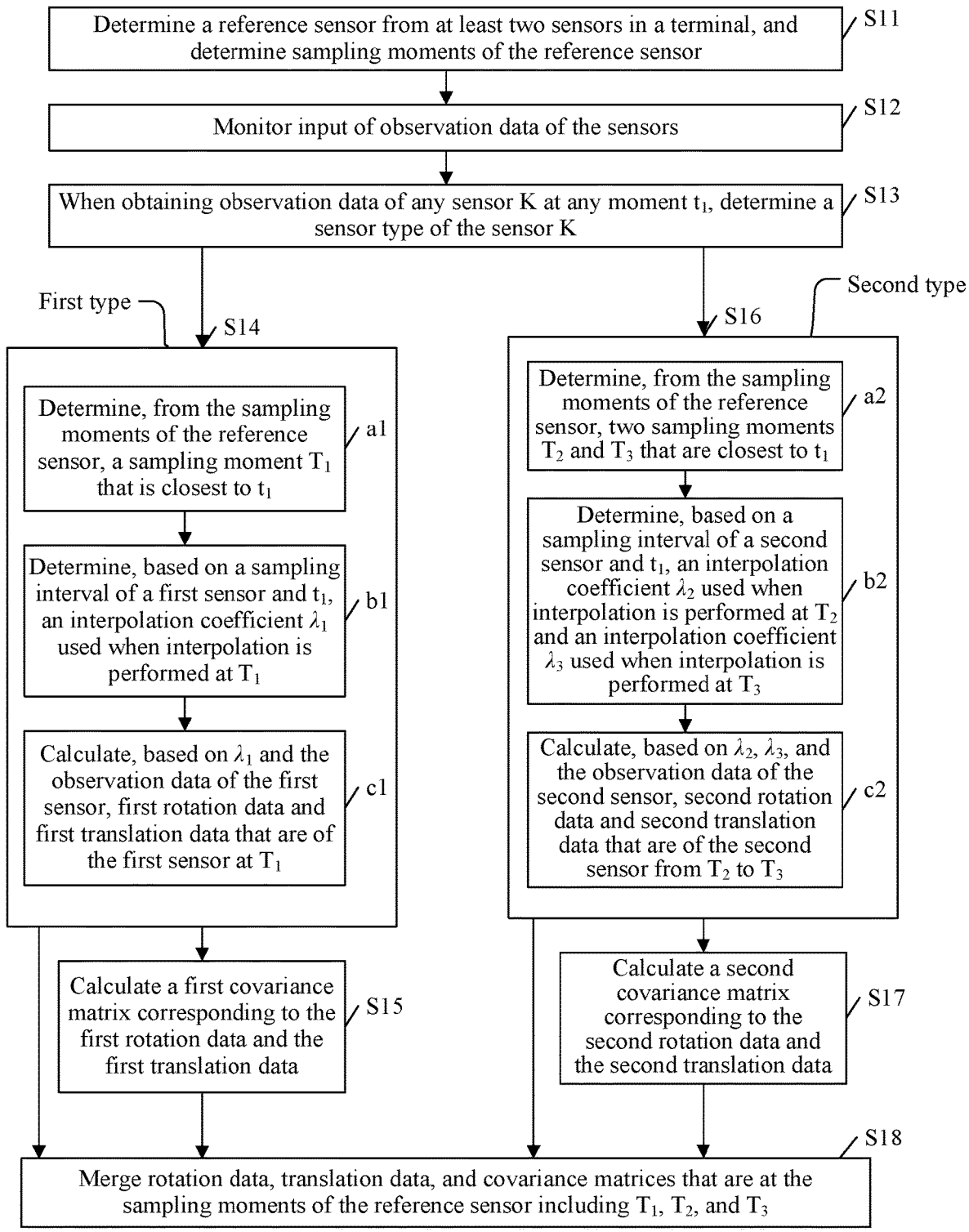
FIG. 3 is a schematic flowchart of a sensor data processing method according to an embodiment of this application.

The following describes, with reference to FIG. 3, some feasible implementations of the map building manner shown in FIG. 2. FIG. 3 is a schematic flowchart of a sensor data processing method according to an embodiment of this application. An implementation described in each operation in the method provided in this embodiment of this application may be performed by a data merging center of a terminal. The method includes the following operations.

S11: Determine a reference sensor from at least two sensors in the terminal, and determine sampling moments of the reference sensor.

In one embodiment, after a system of the terminal is powered on, and after a plurality of sensors with which the terminal is equipped complete a warm-up and confirm that a working status is normal, the sensors may observe a change in a pose of the terminal during movement of the terminal. In specific implementation, the sensors with which the terminal is equipped include but are not limited to a GPS sensor, a visual odometer, and a radar, and may be specifically determined depending on an actual application scenario. This is not limited herein. For ease of description, this embodiment of this application is described by using an example in which the GPS sensor, the visual odometer, and the radar are used as the plurality of sensors with which the terminal is equipped. The GPS sensor is a sensor of a first type, and the visual odometer and the radar are sensors of a second type.

In one embodiment, after the sensors with which the terminal is equipped confirm that the working status is normal, observation data collected by the sensors when the sensors observe a change in the pose of the terminal may be input into the data merging center of the terminal. The data merging center may perform processing such as merging on the observation data of the plurality of sensors to implement map building. In specific implementation, the data merging center may determine the reference sensor from the plurality of sensors, and convert, in a manner such as interpolation calculation and/or mathematical derivation by using sampling frequency of the reference sensor as a reference, the observation data of the sensors with different sampling frequency into observation data presented at same sampling frequency.

After determining the reference sensor, the data merging center may determine the sampling moments of the reference sensor, and use the sampling moments of the reference sensor as alignment moments of the observation data of the plurality of sensors. During alignment of the observation data of the plurality of sensors, observation data input by a sensor other than the reference sensor at a moment adjacent to an alignment moment is converted, in a manner such as interpolation calculation and/or mathematical derivation, into observation data that is at the alignment moment. Then, in a data merging phase, the data merging center only needs to merge observation data that is at the sampling moments of the reference sensor, to implement merging of the observation data of the plurality of sensors. Operations are simple, and data processing efficiency is high.

S12: Monitor input of the observation data of the sensors.

In a feasible implementation, after the sensors confirm that the working status is normal, the data merging center may monitor input of the observation data of the sensors, further perform data alignment on any piece of observation data input by any sensor, and convert observation data input by each sensor into observation data that is at a corresponding alignment moment.

S13: When obtaining observation data of any sensor K at any moment $t_1$, determine a sensor type of the sensor K; and if the sensor K is of the first type, perform operations S14 and S15; or if the sensor K is of the second type, perform operations S16 and S17.

In one embodiment, when receiving, at a moment (for example, $t_1$), observation data that is input by any sensor (for example, the sensor K), the data merging center may first determine the type of the sensor K, to determine a data processing manner for data alignment of the observation data.

In one embodiment, for observation data input by a sensor of the first type, an implementation corresponding to unary pose observation (for ease of description, a unary pose calculation manner is used as an example for description below) may be used for calculating a pose (including a rotation matrix and a translation vector) that is at a sampling moment of the reference sensor and that is corresponding to the observation data of the sensor. For observation data input by a sensor of the second type, an implementation corresponding to binary pose observation (for ease of description, a binary pose calculation manner is used as an example for description below) may be used for calculating a rotation matrix and a translation vector that are at a sampling moment of the reference sensor and that are corresponding to the observation data of the sensor.

S14: Calculate a pose that is at a sampling moment of the reference sensor and that is corresponding to the observation data of the sensor of the first type.

In a feasible implementation, the data merging center may calculate, in the unary pose calculation manner, a rotation matrix and a translation vector that are at a sampling moment of the reference sensor and that are corresponding to the observation data of the sensor of the first type. A calculation process may include the following operations.

a1: Determine, from the sampling moments of the reference sensor, a sampling moment $T_1$ that is closest to $t_1$.

Optionally, $T_1$ may also be referred to as a closest adjacent time stamp or a closest adjacent sampling moment of $t_1$.

b1: Determine, based on a sampling interval of a first sensor and $t_1$, an interpolation coefficient $\lambda_1$ used when interpolation is performed at $T_1$.

In one embodiment, the sensors with which the terminal is equipped may include one or more sensors of the first type. This is not limited herein. For ease of description, the sensor of the first type is described by using the first sensor as an example. Each time the first sensor collects data, the first sensor collects observation data that is at one sampling moment. For example, for each moment, the GPS sensor provides observation data collected at the moment. After obtaining observation data that is of the first sensor at any sampling moment (for example, $t_2$), the data merging center may store the observation data that is at the sampling moment. When observation data at a next sampling moment (for example, $t_1$) of $t_2$ is input, the data merging center may calculate, based on the observation data that is input at $t_1$ and the pre-stored observation data that is at $t_2$, observation data (including a rotation matrix and a translation vector) that is at a sampling moment (for example, $T_1$) of the reference sensor between $t_1$ and $t_2$. In other words, $t_2$ is a closest adjacent sampling moment of $t_1$.

Figure 4:
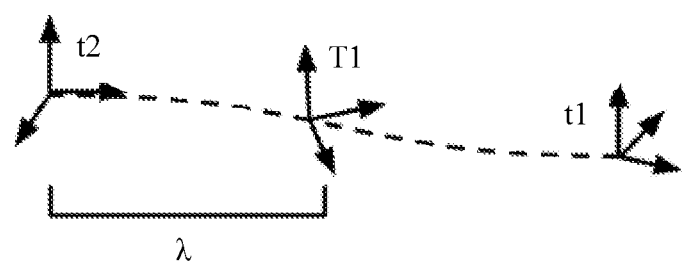
FIG. 4 is a schematic diagram of an interpolation manner according to an embodiment of this application.

FIG. 4 is a schematic diagram of an interpolation manner according to an embodiment of this application. In the interpolation manner shown in FIG. 4, the data merging center may first determine a sampling moment (for example, $t_2$) that is adjacent to and before $t_1$ in sampling moments of the first sensor, based on the sampling interval (for example, $|t_1-t_2|$) of the first sensor. $t_1$ and $t_2$ are two consecutive observation time nodes, $T_1$ is a time node between $t_1$ and $t_2$, and the time node is a sampling moment of the reference sensor. The data merging center may calculate, based on $t_1$, $t_2$, and $T_1$, an interpolation coefficient, for example, $\lambda_1$, used when interpolation is performed at $T_1$.

$\lambda_1$ satisfies:

$$\lambda_1 = \frac{(T_1 - t_2)}{(t_1 - t_2)},$$

$t_1$ and $t_2$ are two consecutive unary pose observation time nodes of the first sensor, and $T_1$ is a target time node of interpolation between $t_1$ and $t_2$.

c1: Calculate, based on $\lambda_1$ and the observation data of the first sensor, first rotation data and first translation data that are of the first sensor at $T_1$.

In one embodiment, after determining $T_1$ and $\lambda_1$, the data merging center may perform, in Euclidean space and Lie group space, processing such as mathematical derivation on the observation data that is at $t_1$ and $t_2$, to obtain a rotation matrix and a translation vector that are of the observation data of the first sensor at $T_1$. Specifically, the data merging center may obtain a rotation matrix (for example, $_G^1R$) and a translation vector (for example, $^Gp_1$) that are of the first sensor at $t_1$, and a rotation matrix (for example, $_G^2R$) and a translation vector (for example, $^Gp_2$) that are of the first sensor at $t_2$, where G represents a global coordinate system. $\{_G^1R, ^Gp_1\}$ represents a pose of the first sensor at $t_1$ in the global coordinate system, and $\{_G^2R, ^Gp_2\}$ represents a pose of the first sensor at $t_2$ in the global coordinate system. The data merging center may calculate, based on $\lambda_1$, $_G^1R$, $^Gp_1$, $_G^2R$, and $^Gp_2$, the first rotation data (for example, a first rotation matrix $_G^{T1}R$) and the first translation data (for example, a first translation vector $^Gp_{T1}$) that are of the first sensor at $T_1$.

$_G^{T1}R$ satisfies:

$$_G^{T1}R = \text{Exp}(\lambda_1 \lfloor \text{Log } v(_G^1R_G^2R^T) \rfloor) \times _G^2R; \text{ and}$$

$^Gp_{T1}$ satisfies:

$$^Gp_{T1} = (1-\lambda_1)^Gp_2 + \lambda_1 ^Gp_1, \text{ where}$$

$\{_G^{T1}R, ^Gp_{T1}\}$ represents a pose of the first sensor at $T_1$ in the global coordinate system.

S15: Calculate a first covariance matrix corresponding to the first rotation data and the first translation data.

In one embodiment, after obtaining the rotation matrix and the translation vector that are at $T_1$, the data merging center may further calculate the covariance matrix (that is, the first covariance matrix) corresponding to the rotation matrix and the translation vector that are at $T_1$. It may be understood that the first covariance matrix corresponding to the rotation matrix and the translation vector that are at $T_1$ may be understood as a confidence level coefficient or an accuracy coefficient of the rotation matrix and the translation vector that are of the first sensor at $T_1$ during merging of data of the plurality of sensors. Herein, the confidence level coefficient or the accuracy coefficient may be alternatively understood as a weight. If rotation matrices and translation vectors that are to be merged at $T_1$ include rotation matrices and translation vectors that are of a plurality of sensors, a confidence level at the moment ($T_1$) of a rotation matrix and a translation vector that are of each sensor may be determined based on a covariance matrix corresponding to the rotation matrix and the translation vector that are of the sensor. The rotation matrices and the translation vectors that are of the plurality of sensors are merged based on rotation matrices and translation vectors that are of the sensors at the moment ($T_1$) and confidence levels thereof. This can more accurately determine a rotation matrix and a translation vector that are of the terminal at the moment ($T_1$).

In specific implementation, the data merging center may calculate a covariance matrix $P_{t1}$ corresponding to the pose (for example, $\{_G^1R, ^Gp_1\}$) that is of the first sensor at $t_1$, calculate a covariance matrix $P_{t2}$ corresponding to the pose (for example, $\{_G^2R, ^Gp_2\}$) that is of the first sensor at $t_2$, calculate a Jacobian matrix (denoted as $H_u1$) based on the first rotation data and the first translation data (for example, $\{_G^{T1}R, ^Gp_{T1}\}$), and calculate, based on $P_{t1}$ and $P_{t2}$, a covariance matrix $P_{T1}$ corresponding to the first rotation matrix and the first translation vector.

$H_u1$ satisfies:

$$H_u1 = \begin{bmatrix} -\frac{i}{2}\hat{R}(J_r(\lambda\text{Log}v(\frac{1}{2}\hat{R}))) & & \frac{i}{2}\hat{R}(J_r(-\lambda\text{Log}v(\frac{1}{2}\hat{R}^T))) & \\ & 0_{3\times3} & & 0_{3\times3} \\ \lambda J_r^{-1}(\text{Log}v(\frac{1}{2}\hat{R})) - I) & & \lambda J_r^{-1}(\text{Log}v(\frac{1}{2}\hat{R}^T))) & \\ 0_{3\times3} & (1-\lambda)I & 0_{3\times3} & \lambda I \end{bmatrix};$$

$P_{T1}$ satisfies:

$$P_i = H_u P_{1,2} H_u^T = \begin{bmatrix} \frac{\delta_G^i\tilde{\theta}}{\delta_G^2\tilde{\theta}} & 0_{3\times3} & \frac{\delta_G^i\tilde{\theta}}{\delta_G^1\tilde{\theta}} & 0_{3\times3} \\ 0_{3\times3} & \frac{\delta^G\tilde{p}_i}{\delta^G\tilde{p}_2} & 0_{3\times3} & \frac{\delta^G\tilde{p}_i}{\delta^G\tilde{p}_1} \end{bmatrix} \begin{bmatrix} P_{t1} & 0_{6\times6} \\ 0_{6\times6} & P_{t2} \end{bmatrix}$$

-continued $$\begin{bmatrix} \frac{\delta_G^i \tilde{\theta}}{\delta_G^2 \tilde{\theta}} & 0_{3\times3} & \frac{\delta_G^i \tilde{\theta}}{\delta_G^1 \tilde{\theta}} & 0_{3\times3} \\ 0_{3\times3} & \frac{\delta^G \tilde{p}_i}{\delta^G \tilde{p}_2} & 0_{3\times3} & \frac{\delta^G \tilde{p}_i}{\delta^G \tilde{p}_1} \end{bmatrix}^T,$$

$P_{1,2}$ represents $P_{t1}$ and $P_{t2}$, R represents an estimate of a rotation matrix R, $O_{3\times3}$ represents a 3×3 all-zero matrix, $O_{6\times6}$ represents a 6×6 all-zero matrix, I represents an identity matrix, i represents $T_1$, G represents the global coordinate system, λ represents the interpolation coefficient $λ_1$, Jr represents a right Jacobian matrix, Log v represents a logarithmic operation of a matrix, and $\tilde{θ}$ and $\tilde{p}$ represent an angle error vector and a displacement error vector, respectively.

S16: Calculate a pose that is at a sampling moment of the reference sensor and that is corresponding to the observation data of the sensor of the second type.

In one embodiment, the data merging center may calculate, in the binary pose calculation manner, a rotation matrix and a translation vector that are at a sampling moment of the reference sensor and that are corresponding to the observation data of the sensor of the second type. A calculation process may include the following operations.

a2: Determine, from the sampling moments of the reference sensor, two sampling moments $T_2$ and $T_3$ that are closest to $t_1$.

To be distinguished from a parameter used in the process of calculating a pose of the sensor of the first type, the two sampling moments closest to $t_1$ may be denoted as $T_2$ and $T_3$ in the process of calculating a pose of the sensor of the second type. $T_2$ may represent a closest adjacent sampling moment of $t_1$, and $T_3$ may represent a second closest adjacent sampling moment of $t_1$. In other words, $T_3$ is a second closest adjacent sampling moment, where a time length between $T_3$ and $t_1$ is greater than a time length between $T_2$ and $t_1$ but less than a time length between another sampling moment and $t_1$. $T_3$ may be a sampling moment, in the sampling moments of the reference sensor, closest to the sampling moment $t_2$ that is before $t_1$. In specific implementation, $T_1$ and $T2$ described in this embodiment of this application may be a same sampling moment, that is, both $T_1$ and $T_2$ are the closest adjacent sampling moment of $t_1$.

b2: Determine, based on a sampling interval of a second sensor and $t_1$, an interpolation coefficient $λ_2$ used when interpolation is performed at $T_2$ and an interpolation coefficient $λ_3$ used when interpolation is performed at $T_3$.

In one embodiment, the sensors with which the terminal is equipped may include one or more sensors of the second type. This is not limited herein. For ease of description, the sensor of the second type is described by using the second sensor as an example. For the second sensor, to observe a motion status of the terminal, the second sensor needs to obtain two sets of observation data (for example, two sets of rotation matrices and translation vectors) of the terminal at two consecutive sampling moments. A relative motion status of the terminal between these two observation time points can be obtained only through calculation performed on the two sets of observation data. A rotation matrix and a translation vector that are of the terminal and that are output by the second sensor are a rotation matrix and a translation vector that are of a relative motion of the terminal between two adjacent sampling moments.

Figure 5:
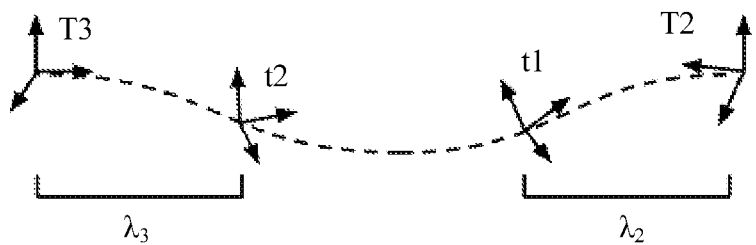
FIG. 5 is another schematic diagram of an interpolation manner according to an embodiment of this application.

FIG. 5 is another schematic diagram of an interpolation manner according to an embodiment of this application. In the interpolation manner shown in FIG. 5, after obtaining $\{_2^1R, {}^2p_1\}$.

In one embodiment, the data merging center may first determine, based on the sampling interval (for example, $|t_1−t_2|$) of the second sensor and $t_1$, a sampling moment $t_2$ that is before $t_1$, and determine, based on $t_1$ and $t_2$, the interpolation coefficient $λ_2$ used when interpolation is performed at $T_2$ and the interpolation coefficient $λ_3$ used when interpolation is performed at $T_3$.

$λ_2$ satisfies:

$$λ_2 = \frac{(T_2 - t_1)}{(t_1 - t_2)};$$

$λ_3$ satisfies:

$$λ_3 = \frac{(t_2 - T_3)}{(t_1 - t_2)},$$

$t_1$ and $t_2$ are two consecutive binary pose observation time nodes of the second sensor, $T_2$ is a sampling moment of the reference sensor closest to $t_1$, and $T_3$ is a sampling moment of the reference sensor closest to $t_2$.

c2: Calculate, based on $λ_2$, $λ_3$, and the observation data of the second sensor, second rotation data and second translation data that are of the second sensor from $T_2$ to $T_3$.

In specific implementation, the data merging center may obtain a rotation matrix (for example, $_2^1R$) of the second sensor between $t_1$ and $t_2$ and a translation vector (for example, ${}^2p_1$) of the second sensor between $t_1$ and $t_2$; and calculate, based on $λ_2$, $λ_3$, $_2^1R$, and ${}^2p_1$, the second rotation data (for example, a second rotation matrix $_{T3}^{T2}R$) and the second translation data (for example, a second translation vector $^{T3}p_{T2}$) that are of a relative motion of the second sensor between $T_2$ and $T_3$.

$_{T3}^{T2}R$ satisfies:

$_{T3}^{T2}R = \text{Exp } v[(1+λ_3+λ_2)\text{Log } v(_2^1R)];$ and $^{T3}p_{T2}$ satisfies:

$^{T3}p_{T2} = (1+λ_3+λ_2)\text{Exp } v[-λ_3 \text{ Log } v(_2^1R)]^2 p_1.$

S17: Calculate a second covariance matrix corresponding to the second rotation data and the second translation data.

In one embodiment, the data merging center may calculate a covariance matrix $P_{t12}$ corresponding to the rotation matrix and the translation vector that are of the second sensor between $t_1$ and $t_2$, calculate a Jacobian matrix (for example, $H_{u2}$) based on the second rotation matrix and the second translation vector, and calculate, based on $P_{t12}$, a covariance matrix $P_{T12}$ corresponding to the second rotation matrix and the second translation vector.

$H_u2$ satisfies:

$$H_u = \begin{bmatrix} J_r[(1+λ_b+λ_s)\text{Log}v(_2^1\hat{R}^T)](1+ & 0_{3\times3} \\ λ_b+λ_s)J_r^{-1}[\text{Log}v(_2^1\hat{R}^T)] & \\ (-(1+λ_b+λ_s)\text{Exp}v[λ_b\text{Log}v(_2^1\hat{R}^T)] & \\ L^2\hat{p}_1 \times ]J_r(λ_b\text{Log}v(_2^1\hat{R}^T)λ_bJ_r^{-1}(\text{Log}v(_2^1\hat{R}^T)) & (1+λ_b+ \\ & λ_s)\text{Exp}v[-λ_b\text{Log}v(_2^1\hat{R})] \end{bmatrix};$$

$P_{T12}$ satisfies:

$$P_{T12} = H_u P_{t12} H_u^T = \begin{bmatrix} \frac{\delta_b^e \tilde{\theta}}{\delta_2^1 \tilde{\theta}} & O_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix} P_{t12} \begin{bmatrix} \frac{\delta_b^e \tilde{\theta}}{\delta_2^1 \tilde{\theta}} & O_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix}^T,$$

where $\hat{R}$ represents an estimate of a rotation matrix R, $O_{3\times 3}$ represents a 3×3 all-zero matrix, b represents $T_3$, e represents $T_2$, $\lambda_b$ represents the interpolation coefficient $\lambda_3$, $\lambda e$ represents the interpolation coefficient $\lambda_2$, Jr represents a right Jacobian matrix, Log v represents a logarithmic operation of a matrix, and $\tilde{\theta}$ and $\tilde{p}$ represent an angle error vector and a displacement error vector, respectively.

S18: Merge rotation data, translation data, and covariance matrices that are at the sampling moments of the reference sensor including $T_1$, $T_2$, and $T_3$.

In one embodiment, the data merging center may merge, based on a smoothing manner, rotation matrices and translation vectors that are of the sensors at the sampling moments of the reference sensor, to obtain pose estimates of the terminal at the sampling moments. The to-be-merged rotation data includes at least the first rotation data and/or the second rotation data, the to-be-merged translation data includes at least the first translation data and/or the second translation data, and the to-be-merged covariance matrices include at least the first covariance matrix and/or the second covariance matrix. The data merging center may globally optimize the pose estimates that are of the terminal at the sampling moments of the reference sensor and that are obtained through merging, and output a verification map built in the global coordinate system. The verification map is used to provide reference data for subsequently determining an online pose estimate of the terminal.

In one embodiment of this application, rotation data and translation data that are input by the sensors and/or covariance matrices may be converted, based on types of the sensors, into data that is at corresponding alignment moments, rotation data, translation data, and/or covariance matrices that are at the alignment moments may be merged, and then optimization may be performed, to output the verification map in the global coordinate system. The verification map can help implement online pose estimation of the terminal when there is no input from the GPS sensor. In this embodiment of this application, merging of the observation data of the plurality of sensors supports out-of-order input of the observation data of the plurality of sensors. Therefore, a data processing manner is flexible, map building accuracy is higher, and applicability is higher.

Embodiment 2

This embodiment of this application provides a possible implementation of implementing online positioning of a terminal by merging observation data of a plurality of sensors. Online positioning may also be referred to as online pose estimation. During online positioning, merging of observation data of the terminal at different locations at different moments does not depend on input of observation data of a sensor of a first type (for example, a GPS sensor). When there is a verification map, observation data collected by a sensor of a second type may be matched with the verification map, to obtain an initial estimate of online pose estimation of the terminal, where the initial estimate may be used as reference data for an online pose estimate. The initial estimate of online pose estimation of the terminal is relatively accurate observation data. However, online positioning of the terminal has a higher requirement for real-time quality. Therefore, after the initial estimate is obtained, optimization may be further performed based on observation data that is input by the sensors in real time, to output a more precise online pose estimate. In specific implementation, a data merging center may merge observation data obtained through matching with the verification map, with observation data that is collected by sensors of the second type in real time; perform incremental smooth iterative optimization on a merging result of the observation data of the plurality of sensors; and finally obtain an online 3D pose estimate of the current terminal in real time. Operations are easy, precision of online pose estimation is high, and applicability is higher.

Figure 6:
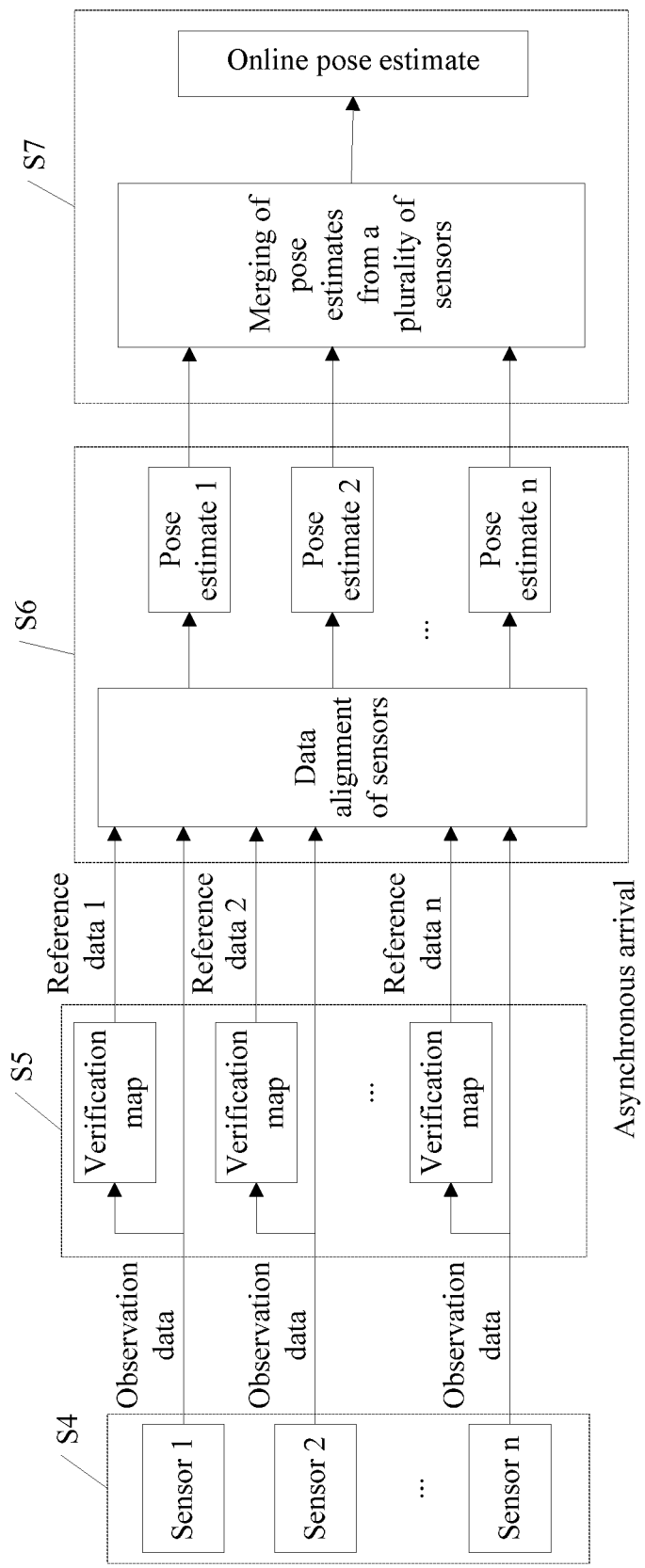
FIG. 6 is a schematic diagram of an online positioning manner based on multi-sensor data merging according to an embodiment of this application.

FIG. 6 is a schematic diagram of an online positioning manner based on multi-sensor data merging according to an embodiment of this application. The map building manner shown in FIG. 6 may alternatively include four data processing processes of S4, S5, S6, and S7.

S4 indicates input of observation data of a plurality of sensors, including input of data of a sensor 1, a sensor 2, . . . , and a sensor n. Observation data of different sensors may be input into a data merging center at different time nodes (for example, different moments). In other words, the data merging center supports asynchronous arrival of the observation data of the plurality of sensors.

S5 indicates input of verification data of a verification map, including but not limited to input of reference data 1 obtained by matching observation data of the sensor 1 with the verification map, reference data 2 obtained by matching observation data of the sensor 2 with the verification map, . . . , and reference data n obtained by matching observation data of the sensor n with the verification map.

S6 indicates data alignment of the plurality of sensors. For details, refer to an implementation described in S2 in Embodiment 1, and details are not described herein again. Then, under a same time reference, observation data of each sensor may represent a pose estimate of a terminal. For example, under the same time reference, observation data of the sensor 1, the sensor 2, . . . , and the sensor n may represent n pose estimates of the terminal, including a pose estimate 1, a pose estimate 2, . . . , and a pose estimate n, respectively.

S7 indicates that after data alignment of the sensors is completed, observation data of all the sensors and reference data obtained by matching the observation data of the sensors with the verification map are merged, incremental smooth iterative optimization is performed on data obtained through the merging, and finally an online 3D pose estimate of the current terminal is obtained in real time. Incremental smooth iterative optimization may use a nonlinear least squares optimization method that is based on a smoothing manner, for example, isam.

Figure 7:
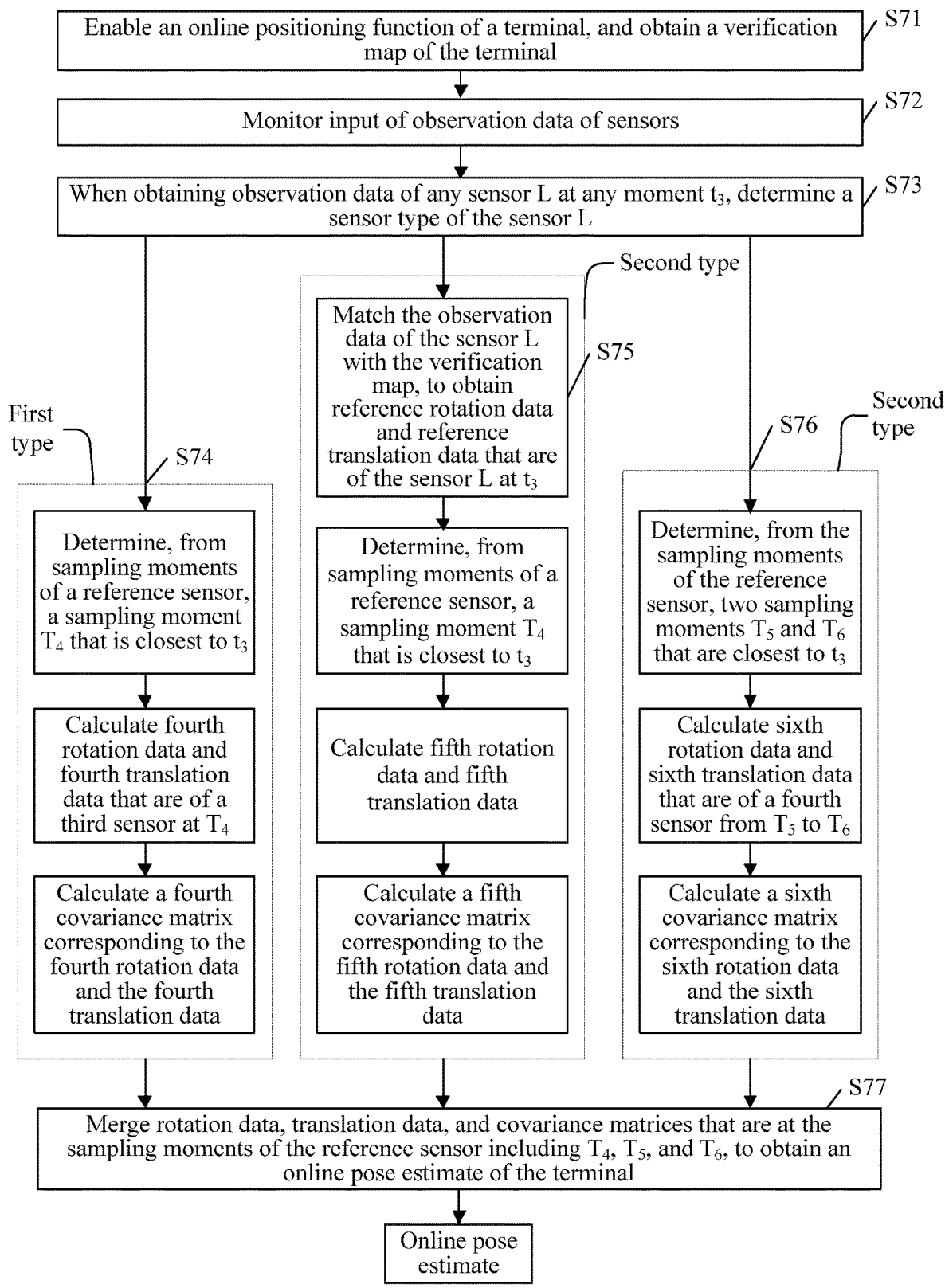
FIG. 7 is another schematic flowchart of a sensor data processing method according to an embodiment of this application.

The following describes, with reference to FIG. 7, a specific implementation of each part of the map building manner shown in FIG. 6. FIG. 7 is another schematic flowchart of a sensor data processing method according to an embodiment of this application. The method provided in this embodiment of this application includes the following operations.

S71: Enable an online positioning function of a terminal, and obtain a verification map of the terminal.

In one embodiment, the terminal may generate the verification map according to the implementation described in the foregoing embodiment, and store the verification map in specified storage space of the terminal. When enabling the online positioning function, the terminal may obtain the verification map from the specified storage space, and use the verification map as reference data for subsequent estimation of an online pose of the terminal.

S72: Monitor input of observation data of sensors.

In one embodiment, for an implementation of monitoring, by a data merging center, input of the observation data of the sensors, refer to the implementation described in operation S12 in Embodiment 1, and details are not described herein again.

S73: When obtaining observation data of any sensor L at any moment $t_3$, determine a sensor type of the sensor L; and if the sensor L is of a first type, perform operation S74; or if the sensor L is of a second type, perform operations S75 and S76.

In one embodiment, when receiving, at a moment (for example, $t_3$), observation data that is input by any sensor (for example, the sensor L), the data merging center may first determine the type of the sensor L, to determine a data processing manner for data alignment of the observation data. Optionally, the sensor K and the sensor L may be alternatively a same sensor. This is not limited herein.

In one embodiment, for observation data input by a sensor of the first type, an implementation corresponding to unary pose observation (for ease of description, a unary pose calculation manner is used as an example for description below) may be used for calculating a pose (including a rotation matrix and a translation vector) that is at a sampling moment of a reference sensor and that is corresponding to the observation data of the sensor. For details, refer to the implementation described in operation S14 in Embodiment 1, and details are not described herein again.

If the sensor L is a sensor of the first type, the data merging center may further match the observation data of the sensor L with the verification map, and calculate, according to the implementation corresponding to unary pose observation, a pose (including a rotation matrix and a translation vector) that is at a sampling moment of the reference sensor and to which the observation data obtained through the matching is aligned. For an implementation of aligning the observation data obtained through the matching to the rotation matrix and the translation vector that are at the sampling moment of the reference sensor, refer to the implementation described in operation S14 in Embodiment 1, and details are not described herein again.

If the sensor L is a sensor of the second type, the data merging center may calculate, according to an implementation corresponding to binary pose observation (for ease of description, a binary pose calculation manner is used as an example for description below), a rotation matrix and a translation vector that are at a sampling moment of the reference sensor and that are corresponding to the observation data of the sensor.

S74: Calculate a pose that is at a sampling moment of the reference sensor and that is corresponding to observation data of the sensor of the first type.

In one embodiment, for ease of description and to be distinguished from the first sensor in Embodiment 1, the sensor of the first type herein is described by using a third sensor as an example. The first sensor and the third sensor may be alternatively a same sensor. This is not limited herein.

If the sensor L is the third sensor of the first type, the data merging center may determine, from sampling moments of the reference sensor, a sampling moment (for example, $T_4$) that is closest to $t_3$, and calculate rotation data (for example, fourth rotation data) and translation data (for example, fourth translation data) that are of the third sensor at $T_4$ and a covariance (for example, a fourth covariance matrix) corresponding to the fourth rotation data and the fourth translation data. In specific implementation, for an implementation of calculating the fourth rotation data, the fourth translation data, and/or the fourth covariance matrix by the data merging center, refer to implementations described in operations in operation S14 and operation S15 in Embodiment 1, and details are not described herein again. Herein, the rotation data may be a rotation matrix, and the translation data may be a translation vector. For details, refer to corresponding implementations in Embodiment 1, and details are not described herein again.

S75: Match the observation data of the sensor L with the verification map, to obtain reference rotation data and reference translation data that are of the sensor L at $t_3$.

For ease of description and to be distinguished from the second sensor of the second type in Embodiment 1, an example in which a fourth sensor is used as the sensor of the second type is used herein for description. The second sensor and the fourth sensor may be alternatively a same sensor. This is not limited herein.

In one embodiment, a data merging terminal may match observation data of the fourth sensor at $t_3$ with the verification map, to determine reference rotation data and reference translation data that are of the fourth sensor at $t_3$, for example, a reference rotation matrix and/or a reference translation vector.

In one embodiment, if there is the verification map in the terminal, the data merging center may match currently obtained observation data of the fourth sensor with the verification map, and input a matching result into a processing flow of the unary pose calculation manner, for example, the implementation described in operations a1 to c1 in Embodiment 1, and the implementation described in operation S5 in Embodiment 1. Details are not described herein again. The data merging center may calculate, based on the reference rotation matrix and/or the reference translation vector that are/is of the fourth sensor at $t_3$, rotation data (fifth rotation data, for example, a fifth rotation matrix) and translation data (fifth translation data, for example, a fifth translation vector) that are of the fourth sensor at $T_4$ and a covariance matrix (for example, a fifth covariance matrix) corresponding to the fifth rotation data and the fifth translation data.

S76: Calculate rotation data and translation data that are at a sampling moment of the reference sensor and that are corresponding to the observation data of the sensor of the second type, and calculate a covariance corresponding to the rotation data and the translation data.

$\lambda_6$) used when interpolation is performed at $T_6$; calculate, based on $\lambda_5$, $\lambda_6$, the observation data of the fourth sensor at $t_3$, and observation data of the fourth sensor at $t_4$, rotation data (sixth rotation data, for example, a sixth rotation matrix) and translation data (sixth translation data, for example, a sixth translation vector) that are of the fourth sensor from $T_5$ to $T_6$; and calculate a covariance matrix (for example, a sixth covariance) corresponding to the sixth rotation data and the sixth translation data. In specific implementation, for an implementation of calculating, by the data merging center, the rotation data and the translation data (for example, a rotation matrix and a translation vector) that are at a sampling moment of the reference sensor and that are corresponding to the observation data of the sensor of the second type, and for an implementation of calculating, by the data merging center, the covariance matrix corresponding to the rotation data and the translation data, refer to implementations described in operations S16 and S17 in Embodiment 1, and details are not described herein again.

S77: Merge rotation data, translation data, and covariance matrices that are at the sampling moments of the reference sensor including $T_4$, $T_5$, and $T_6$, to obtain an online pose estimate of the terminal.

In one embodiment, the data merging center may merge, based on a smoothing manner, rotation matrices, translation vectors, and/or covariance matrices that are of the sensors at the sampling moments of the reference sensor, to obtain pose estimates of the terminal at the sampling moments. The to-be-merged rotation data includes at least the fourth rotation data, the fifth rotation data, or the sixth rotation data, the to-be-merged translation data includes at least the fourth translation data, the fifth translation data, or the sixth translation data, and the to-be-merged covariance matrices include at least the fourth covariance matrix, the fifth covariance matrix, or a sixth covariance matrix.

In one embodiment of this application, the data merging center may match the observation data of the sensors with the verification map; merge observation data obtained through the matching, with observation data that is collected by the sensors in real time; perform incremental smooth iterative optimization on a merging result of the observation data of the plurality of sensors; and finally obtain an online pose estimate of the current terminal in real time. Operations are easy, precision of online pose estimation is high, and applicability is higher.

Figure 8:
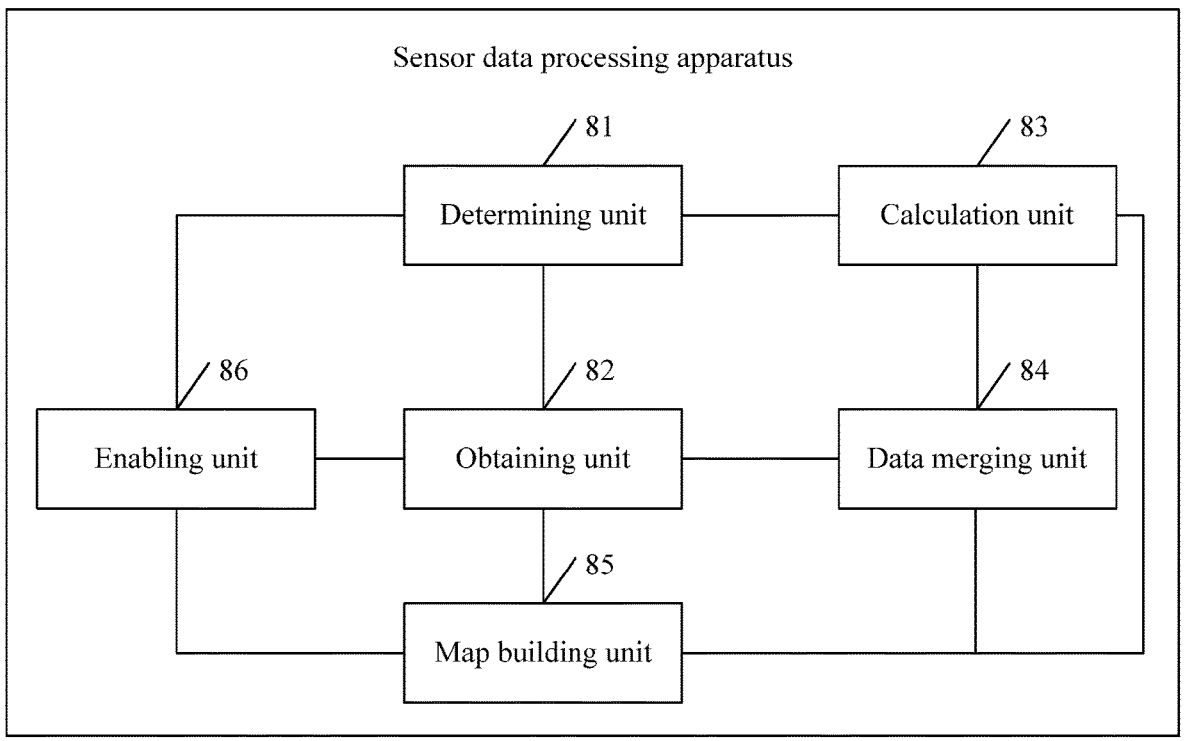
FIG. 8 is a schematic structural diagram of a sensor data processing apparatus according to an embodiment of this application.

FIG. 8 is a schematic structural diagram of a sensor data processing apparatus according to an embodiment of this application. The sensor data processing apparatus provided in this embodiment of this application may include:

a determining unit 81, configured to: determine a reference sensor from at least two sensors in a terminal, and determine sampling moments of the reference sensor;

an obtaining unit 82, configured to obtain observation data of any sensor, where the determining unit 81 is further configured to: when the obtaining unit 82 obtains observation data of any sensor K at any moment $t_1$, determine a sensor type of the sensor K; and the determining unit 81 is further configured to: when the sensor K is a first sensor of a first type, determine, from the sampling moments of the reference sensor, a sampling moment $T_1$ that is closest to $t_1$, and determine, based on a sampling interval of the first sensor and $t_1$, an interpolation coefficient $\lambda_1$ used when interpolation is performed at $T_1$;

a calculation unit 83, configured to: calculate, based on $\lambda_1$ determined by the determining unit 81 and the observation data of the first sensor obtained by the obtaining unit 82, first rotation data and first translation data that are of the first sensor at $T_1$, and calculate a first covariance matrix corresponding to the first rotation data and the first translation data, where the determining unit 81 is further configured to: when the sensor K is a second sensor of a second type, determine, from the sampling moments of the reference sensor, two sampling moments $T_2$ and $T_3$ that are closest to $t_1$, and determine, based on a sampling interval of the second sensor and $t_1$, an interpolation coefficient $\lambda_2$ used when interpolation is performed at $T_2$ and an interpolation coefficient $\lambda_3$ used when interpolation is performed at $T_3$; and the calculation unit 83 is further configured to: calculate, based on $\lambda_2$ and $\lambda_3$ that are determined by the determining unit 81 and the observation data of the second sensor, second rotation data and second translation data that are of the second sensor from $T_2$ to $T_3$, and calculate a second covariance matrix corresponding to the second rotation data and the second translation data; and a data merging unit 84, configured to merge rotation data, translation data, and covariance matrices that are at the sampling moments of the reference sensor including $T_1$, $T_2$, and $T_3$ and that are obtained through processing by the calculation unit 83, to obtain pose estimates of the terminal at the sampling moments, where the to-be-merged rotation data includes at least the first rotation data and/or the second rotation data, the to-be-merged translation data includes at least the first translation data and/or the second translation data, and the to-be-merged covariance matrices include at least the first covariance matrix and/or the second covariance matrix.

In one embodiment, the determining unit 81 is configured to:

determine, based on the sampling interval of the first sensor, a closest adjacent sampling moment $t_2$ that is before $t_1$, and calculate, based on $t_1$ and $t_2$, the interpolation coefficient $\lambda_1$ used when interpolation is performed at $T_1$, where $\lambda_1$ satisfies:

$$\lambda_1 = \frac{(T_1 - t_2)}{(t_1 - t_2)}.$$

In one embodiment, the observation data of the first sensor includes a rotation matrix and a translation vector that are of the first sensor; the obtaining unit 82 is configured to obtain a rotation matrix $_G^1 R$ and a translation vector $^G p_1$ that are of the first sensor at $t_1$, and a rotation matrix $_G^1 R$ and a translation vector $^G p_2$ that are of the first sensor at $t_2$; and the calculation unit 83 is configured to calculate, based on $\lambda_1$, $_G^1 R$, $^G p_1$, $_G^2 R$, and $^G p_2$ that are obtained by the obtaining unit 82, a first rotation matrix $_G^{T_1} R$ and a first translation vector $_G^2 p_{T_1}$ that are of the first sensor at $T_1$, where $_G^{T_1} R$ satisfies:

$$_G^{T_1} R = \mathrm{Exp}(\lambda_1 \lfloor \mathrm{Log}\ v(_G^1 R\, _G^2 R^T)\rfloor) \times {_G^2 R};\ \mathrm{and}$$

$^G p_{T_1}$ satisfies:

$$^G p_{T_1} = (1 - \lambda_1)\, ^G p_2\, ^G p_1,\ \mathrm{where}$$

the first rotation matrix $_G^{T_1} R$ is the first rotation data, and the first translation vector $^G p_{T_1}$ is the first translation data.

In one embodiment, the calculation unit 83 is configured to:

calculate a covariance matrix $P_{t_1}$ corresponding to a pose that is of the first sensor at $t_1$, and calculate a covariance matrix $P_{t_2}$ corresponding to a pose that is of the first sensor at $t_2$; and calculate a Jacobian matrix $H_u$ based on the first rotation data and the first translation data, and calculate, based on $P_{t1}$ and $P_{t2}$, a covariance matrix $P_{T1}$ corresponding to the first rotation data and the first translation data, where $$H_u = \begin{Bmatrix} -\frac{i}{2}\hat{R}(J_r(\lambda \text{Log} v(\frac{1}{2}\hat{R}))) & 0_{3\times 3} & \frac{i}{2}\hat{R}(J_r(-\lambda \text{Log} v(\frac{1}{2}\hat{R}))) & 0_{3\times 3} \\ \lambda J_r^{-1}(\text{Log} v(\frac{1}{2}\hat{R})) - I) & & \lambda J_r^{-1}(\text{Log} v(\frac{1}{2}\hat{R}))) & \\ 0_{3\times 3} & (1-\lambda)I & 0_{3\times 3} & \lambda I \end{Bmatrix};$$

$H_u$ satisfies:

$$P_{T1} = H_U P_{1,2} H_u^T = \begin{bmatrix} \frac{\delta_G^i \tilde{\theta}}{\delta_G^2 \tilde{\theta}} & 0_{3\times 3} & \frac{\delta_G^i \tilde{\theta}}{\delta_G^1 \tilde{\theta}} & 0_{3\times 3} \\ 0_{3\times 3} & \frac{\delta^G \tilde{p}_i}{\delta^G \tilde{p}_2} & 0_{3\times 3} & \frac{\delta^G \tilde{p}_i}{\delta^G \tilde{p}_1} \end{bmatrix} \begin{bmatrix} P_{t1} & 0_{6\times 6} \\ 0_{6\times 6} & P_{t2} \end{bmatrix} \begin{bmatrix} \frac{\delta_G^i \tilde{\theta}}{\delta_G^2 \tilde{\theta}} & 0_{3\times 3} & \frac{\delta_G^i \tilde{\theta}}{\delta_G^1 \tilde{\theta}} & 0_{3\times 3} \\ 0_{3\times 3} & \frac{\delta^G \tilde{p}_i}{\delta^G \tilde{p}_2} & 0_{3\times 3} & \frac{\delta^G \tilde{p}_i}{\delta^G \tilde{p}_1} \end{bmatrix}^T,$$

$P_{T1}$ satisfies:
where $P_{1,2}$ represents $P_{t1}$ and $P_{t2}$, $\hat{R}$ represents an estimate of a rotation matrix R, $O_{3\times 3}$ represents a 3×3 all-zero matrix, $O_{6\times 6}$ represents a 6×6 all-zero matrix, I represents an identity matrix, i represents $T_1$, G represents a global coordinate system, $\lambda$ represents the interpolation coefficient $\lambda_1$, Jr represents a right Jacobian matrix, Log v represents a logarithmic operation of a matrix, and $\tilde{\theta}$ and $\tilde{p}$ represent an angle error vector and a displacement error vector, respectively.

In one embodiment, the determining unit 81 is configured to:

determine, based on the sampling interval of the second sensor and $t_1$, a sampling moment $t_2$ that is before $t_1$, and determine, based on $t_1$ and $t_2$, the interpolation coefficient $\lambda_2$ used when interpolation is performed at $T_2$ and the interpolation coefficient $\lambda_3$ used when interpolation is performed at $T_3$, where $\lambda_2$ satisfies:
and $$\lambda_2 = \frac{(T_2 - t_1)}{(t_1 - t_2)};$$

$\lambda_3$ satisfies:

$$\lambda_3 = \frac{(t_2 - T_3)}{(t_1 - t_2)},$$

where $T_2$ represents a sampling moment closest to $t_1$ among the sampling moments of the reference sensor, and $T_3$ represents a sampling moment closest to $t_2$ among the sampling moments of the reference sensor.

In a feasible implementation, the observation data of the second sensor includes a $_2^1R$ of the second sensor between $t_1$ and $t_2$ and a translation vector $^2p_1$ of the second sensor between $t_1$ and $t_2$; and the calculation unit 83 is configured to calculate, based on $\lambda_2$, $\lambda_3$, $_2^1R$, and $^2p_1$ that are obtained by the obtaining unit 82, a second rotation matrix $_{T3}^{T2}R$ and a second translation vector $^{T3}p_{T2}$ that are of a relative motion of the second sensor between $T_2$ and $T_3$, where $_{T3}^{T2}R$ satisfies:

$$_{T3}^{T2}R = \text{Exp } v[(1+\lambda_3+\lambda_2)\text{Log } v(_2^1R)]; \text{ and}$$

$^{T3}p_{T2}$ satisfies:

$$^{T3}p_{T2} = (1+\lambda_3+\lambda_2)\text{Exp } v[-\lambda_3 \text{ Log } v(_2^1R)]_2p_1.$$

In one embodiment, the calculation unit 83 is configured to:

calculate a covariance matrix $P_{t12}$ corresponding to the rotation matrix and the translation vector that are of the second sensor between $t_1$ and $t_2$, calculate a Jacobian matrix $H_u$ based on the second rotation data and the second translation data, and calculate, based on $P_{t12}$, a covariance matrix $P_{T12}$ corresponding to the second rotation data and the second translation data, where $H_u$ satisfies:

$$H_u = \begin{bmatrix} J_r[(1+\lambda_b+\lambda_s)\text{Log} v(\frac{1}{2}\hat{R}^T)](1+ & 0_{3\times 3} \\ \lambda_b+\lambda_s)J_r^{-1}[\text{Log} v(\frac{1}{2}\hat{R}^T)] & \\ (-(1+\lambda_b+\lambda_s)\text{Exp} v[\lambda_b \text{Log} v(\frac{1}{2}\hat{R}^T)] & \\ L^2\tilde{p}_1 \times J_r(\lambda_b \text{Log} v(\frac{1}{2}\hat{R}^T)\lambda_b J_r^{-1}(\text{Log} v(\frac{1}{2}\hat{R}^T)) & (1+\lambda_b+ \\ & \lambda_s)\text{Exp} v[-\lambda_b \text{Log} v(\frac{1}{2}\hat{R})] \end{bmatrix};$$

and $P_{T12}$ satisfies:

$$P_{T12} = H_u P_{t12} H_u^T = \begin{bmatrix} \frac{\delta_b^e \tilde{\theta}}{\delta_2^1 \tilde{\theta}} & 0_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix} P_{t12} \begin{bmatrix} \frac{\delta_b^e \tilde{\theta}}{\delta_2^1 \tilde{\theta}} & 0_{3\times 3} \\ \frac{\delta^b \tilde{p}_e}{\delta_2^1 \tilde{\theta}} & \frac{\delta^b \tilde{p}_e}{\delta^2 \tilde{p}_1} \end{bmatrix}^T,$$

where $\hat{R}$ represents an estimate of a rotation matrix R, $O_{3\times 3}$ represents a 3×3 all-zero matrix, b represents $T_3$, e represents $T_2$, $\lambda_b$ represents the interpolation coefficient $\lambda_3$, $\lambda_e$ represents the interpolation coefficient $\lambda_2$, Jr represents a right Jacobian matrix, Log v represents a logarithmic operation of a matrix, and $\tilde{\theta}$ and $\tilde{p}$ represent an angle error vector and a displacement error vector, respectively.

In a feasible implementation, the apparatus further includes: a map building unit 85, configured to build a verification map in the global coordinate system based on rotation matrices and translation vectors that are at the sampling moments of the reference sensor including $T_1$, $T_2$, and/or $T_3$, and based on the pose estimates of the terminal at the sampling moments, where the rotation matrices, the translation vectors, and the pose estimates are obtained through processing by the data merging unit 84; and the verification map is used to provide reference data for determining an online pose estimate of the terminal.

In one embodiment, the apparatus further includes:

an enabling unit 86, configured to: enable an online positioning function of the terminal, and obtain the verification map of the terminal, where the determining unit 81 is further configured to: when the obtaining unit 82 obtains observation data of any sensor L at any moment $t_3$, determine a sensor type of the sensor L;

the determining unit 81 is further configured to: when the sensor L is a third sensor of the first type, determine, from the sampling moments of the reference sensor, a sampling moment $T_4$ that is closest to $t_3$;

the calculation unit 83 is further configured to calculate fourth rotation data and fourth translation data that are of the third sensor at $T_4$ and a fourth covariance matrix corresponding to the fourth rotation data and the fourth translation data;

if the sensor L is a fourth sensor of the second type, the determining unit 81 and the calculation unit 83 are further configured to perform operations as follows:

the determining unit 81 is further configured to: match observation data of the fourth sensor at $t_3$ with the verification map, to determine reference rotation data and reference translation data that are of the fourth sensor at $t_3$; and determine, from the sampling moments of the reference sensor, a sampling moment $T_4$ that is closest to $t_3$;

the calculation unit 83 is further configured to calculate, based on the reference rotation data and the reference translation data that are of the fourth sensor at $t_3$, fifth rotation data and fifth translation data that are of the fourth sensor at $T_4$ and a fifth covariance matrix corresponding to the fifth rotation data and the fifth translation data;

the determining unit 81 is further configured to: determine, from the sampling moments of the reference sensor, two sampling moments $T_5$ and $T_6$ that are closest to $t_3$, and determine, based on a sampling interval of the fourth sensor and $t_3$, an interpolation coefficient $\lambda_5$ used when interpolation is performed at $T_5$ and an interpolation coefficient $\lambda_6$ used when interpolation is performed at $T_6$;

the calculation unit 83 is further configured to calculate, based on $\lambda_5$, $\lambda_6$, and the observation data of the fourth sensor, sixth rotation data and sixth translation data that are of the fourth sensor from $T_5$ to $T_6$, and calculate a sixth covariance matrix corresponding to the sixth rotation data and the sixth translation data; and the data merging unit 84 is further configured to merge rotation data, translation data, and covariance matrices that are at the sampling moments of the reference sensor including $T_4$, $T_5$, and $T_6$ and that are obtained through processing by the calculation unit 83, to obtain the online pose estimate of the terminal, where the to-be-merged rotation data includes at least the fourth rotation data, the fifth rotation data, or the sixth rotation data, the to-be-merged translation data includes at least the fourth translation data, the fifth translation data, or the sixth translation data, and the to-be-merged covariance matrices include at least the fourth covariance matrix, the fifth covariance matrix, or the sixth covariance matrix.

In one embodiment, a sensor of the first type including the first sensor and/or the third sensor is configured to collect rotation data and translation data that are of the sensor of the first type at any sampling moment of the sensor of the first type.

In one embodiment, a sensor of the second type including the second sensor and/or the fourth sensor is configured to collect rotation data and translation data that are of a relative motion of the sensor of the second type between any two adjacent sampling moments of the sensor of the second type.

In one embodiment, the sensor data processing apparatus provided in this embodiment of this application may be alternatively the terminal provided in the embodiments of this application. The sensor data processing apparatus provided in this embodiment of this application may perform, by using built-in units of the sensor data processing apparatus, implementations described in the foregoing implementations, and details are not described herein again.

Figure 9:
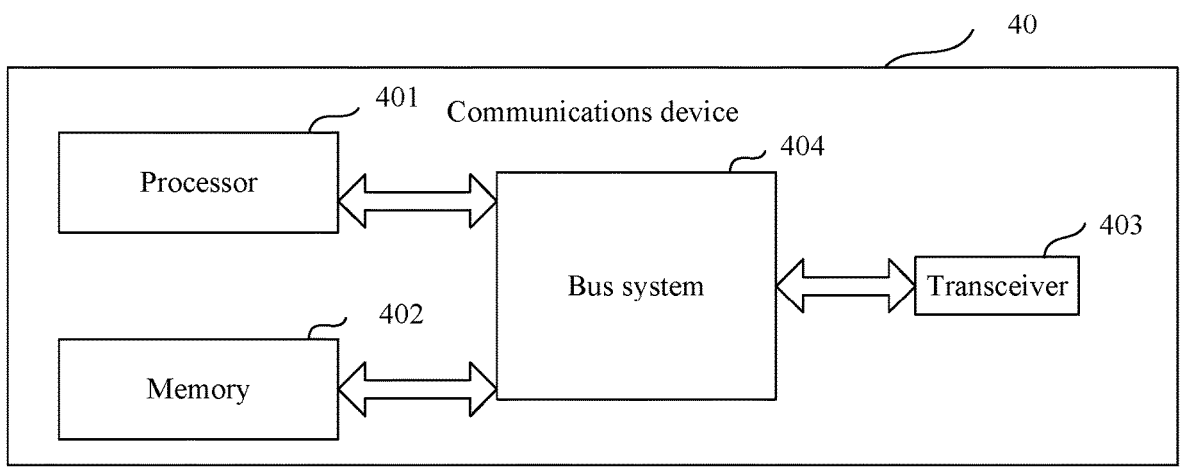
FIG. 9 is a schematic structural diagram of a communications device according to an embodiment of this application.

FIG. 9 is a schematic structural diagram of a communications device 40 according to an embodiment of this application. As shown in FIG. 9, the communications device 40 provided in this embodiment of this application includes a processor 401, a memory 402, a transceiver 403, and a bus system 404. The processor 401, the memory 402, and the transceiver 403 are connected by using the bus system 404.

The memory 402 is configured to store a program. Specifically, the program may include program code, and the program code includes a computer operation instruction. The memory 402 includes but is not limited to a random access memory (RAM), a read-only memory (ROM), an erasable programmable read only memory (EPROM), or a compact disc read-only memory (CD-ROM). FIG. 9 shows only one memory. Certainly, a plurality of memories may be alternatively disposed depending on a requirement. The memory 402 may be alternatively a memory in the processor 401. This is not limited herein.

The memory 402 stores the following elements: an executable module or a data structure, a subset thereof, or an extended set thereof:

an operation instruction: including various operation instructions, used to implement various operations; and an operating system: including various system programs, used to implement various basic services and process a hardware-based task.

The processor 401 controls an operation of the communications device 40. The processor 401 may be one or more central processing units (CPU). When the processor 401 is one CPU, the CPU may be a single-core CPU, or may be a multi-core CPU.

In one embodiment, components of the communications device 40 are coupled together by using the bus system 404. In addition to a data bus, the bus system 404 may further include a power bus, a control bus, a status signal bus, and the like. However, for clear description, in FIG. 9, various types of buses are all marked as the bus system 404. For ease of representation, only a schematic drawing is shown in FIG. 9.

The sensor data processing method disclosed in the foregoing embodiments and provided in the embodiments of this application may be applied to the processor 401, or may be implemented by the processor 401. The processor 401 may be an integrated circuit chip and has a signal processing capability. In an implementation process, operations of the foregoing method can be implemented by using a hardware integrated logic circuit in the processor 401, or by using an instruction in a form of software. The processor 401 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The processor 401 may implement or perform the methods, operations, and logical block diagrams disclosed in the embodiments of this application. The general purpose processor may be a microprocessor, or the processor may be any conventional processor or the like. The operations of the method disclosed with reference to the embodiments of this application may be directly implemented by a hardware decoding processor, or may be implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 402. The processor 401 reads information in the memory 402, and performs, in combination with hardware of the processor 401, the operations of the sensor data processing method described in the foregoing embodiments.

A person of ordinary skill in the art may understand that all or some of the processes of the method in the foregoing embodiments may be implemented by a computer program instructing relevant hardware. The program may be stored in a computer readable storage medium. During execution of the program, the processes in the foregoing method embodiments may be performed. The storage medium includes any medium that can store program code, such as a ROM, a random access memory RAM, a magnetic disk, or a compact disc.

What is claimed is:

1. A sensor data processing method, comprising:
   determining a reference sensor from at least two sensors in a terminal, and determining sampling moments of the reference sensor;
   obtaining observation data of any sensor K at any moment $t_1$;
   after determining that
   the sensor K is a first sensor of a first type,
   determining, from the sampling moments of the reference sensor, a sampling moment $T_1$ that is closest to $t_1$, determining, based on a sampling interval of the first sensor and $t_1$, an interpolation coefficient $\lambda_1$ used when interpolation is performed at $T_1$, calculating, based on $\lambda_1$ and the observation data of the first sensor, first rotation data and first translation data that are of the first sensor at $T_1$, and calculating a first covariance matrix corresponding to the first rotation data and the first translation data;
   after determining that the sensor K is a second sensor of a second type, determining, from the sampling moments of the reference sensor, two sampling moments $T_2$ and $T_3$ that are closest to $t_1$, determining, based on a sampling interval of the second sensor and $t_1$, an interpolation coefficient $\lambda_2$ used when interpolation is performed at $T_2$ and an interpolation coefficient $\lambda_3$ used when interpolation is performed at $T_3$, calculating, based on $\lambda_2$, $\lambda_3$, and the observation data of the second sensor, second rotation data and second translation data that are of the second sensor from $T_2$ to $T_3$, and calculating a second covariance matrix corresponding to the second rotation data and the second translation data; and
   merging rotation data, translation data, and covariance matrices that are at the sampling moments of the reference sensor comprising $T_1$, $T_2$, and $T_3$, to obtain pose estimates of the terminal at the sampling moments, wherein
   the rotation data comprises at least one of the first rotation data or the second rotation data, the translation data comprises at least one of the first translation data or the second translation data, and the covariance matrices comprise at least one of the first covariance matrix or the second covariance matrix.

2. The method according to claim 1, wherein the determining, based on a sampling interval of the first sensor and $t_1$, an interpolation coefficient $\lambda_1$ used when interpolation is performed at $T_1$ comprises:
   determining, based on the sampling interval of the first sensor, a closest adjacent sampling moment $t_2$ that is before $t_1$, and calculating, based on $t_1$ and $t_2$, the interpolation coefficient $\lambda_1$ used when interpolation is performed at $T_1$, wherein
   $\lambda_1$ satisfies:

$$\lambda_1 = \frac{(T_1 - t_2)}{(t_1 - t_2)}.$$

3. The method according to claim 2, wherein the observation data of the first sensor comprises a rotation matrix and a translation vector of the first sensor; and
   the calculating, based on $\lambda_1$ and the observation data of the first sensor, first rotation data and first translation data of the first sensor at $T_1$ comprises:
   obtaining a rotation matrix $_G^1R$ and a translation vector $^Gp_1$ of the first sensor at $t_1$, and a rotation matrix $_G^2R$ and a translation vector $^Gp_2$ of the first sensor at $t_2$; and
   calculating, based on $\lambda_1$, $_G^1R$, $^Gp_1$, $_G^2R$, and $^Gp_2$, a first rotation matrix $_G^{T1}R$ and a first translation vector $^Gp_{T1}$ of the first sensor at $T_1$, wherein
   $_G^{T1}R$ satisfies:

$$_G^{T1}R = \text{Exp}(\lambda_1 \lfloor \text{Log } v(_G^1R_G^2R^T) \rfloor) \times {_G^2R}; \text{ and}$$

$^Gp_{T1}$ satisfies:

$$^Gp_{T1} = (1-\lambda_1)^Gp_2 + \lambda_1{^Gp_1}, \text{ wherein}$$

the first rotation matrix $_G^{T1}R$ is the first rotation data, and the first translation vector $^Gp_{T1}$ is the first translation data, and wherein G represents a global coordinate system, Log v represents a logarithmic operation of a matrix, and T represents a transpose of a matrix.

4. The method according to claim 1, wherein the determining, based on a sampling interval of the second sensor and $t_1$, an interpolation coefficient $\lambda_2$ used when interpolation is performed at $T_2$ and an interpolation coefficient $\lambda_3$ used when interpolation is performed at $T_3$ comprises:
   determining, based on the sampling interval of the second sensor and $t_1$, a closest adjacent sampling moment $t_2$ that is before $t_1$, and determining, based on $t_1$ and $t_2$, the interpolation coefficient $\lambda_2$ used when interpolation is performed at $T_2$ and the interpolation coefficient $\lambda_3$ used when interpolation is performed at $T_3$, wherein
   $\lambda_2$ satisfies:

$$\lambda_2 = \frac{(T_2 - t_1)}{(t_1 - t_2)};$$

and
   $\lambda_3$ satisfies:

$$\lambda_3 = \frac{(t_2 - T_3)}{(t_1 - t_2)},$$

wherein
   $T_2$ represents a sampling moment closest to $t_1$ among the sampling moments of the reference sensor, and $T_3$ represents a sampling moment closest to $t_2$ among the sampling moments of the reference sensor.

5. The method according to claim 4, wherein the observation data of the second sensor comprises a rotation matrix and a translation vector of the second sensor; and
the calculating, based on $\lambda_2$, $\lambda_3$, and the observation data of the second sensor, second rotation data and second translation data of the second sensor from $T_2$ to $T_3$ comprises:
obtaining a rotation matrix $_2^1R$ of the second sensor between $t_1$ and $t_2$ and a translation vector $^2p_1$ of the second sensor between $t_1$ and $t_2$; and
calculating, based on $\lambda_2$, $\lambda_3$, $_2^1R$, and $^2p_1$, a second rotation matrix $_{T3}^{T2}R$ and a second translation vector $^{T3}p_{T2}$ of a relative motion of the second sensor between $T_2$ and $T_3$, wherein
$_{T3}^{T2}R$ satisfies:

$$_{T3}^{T2}R = \text{Exp } v[(1+\lambda_3\lambda_2)\text{Log } v(_2^1R)]; \text{ and}$$

$^{T3}p_{T2}$ satisfies:

$$^{T3}p_{T2} = (1+\lambda_3+\lambda_2)\text{Exp } v[-\lambda_3 \text{ Log } v(_2^1R)]^2 p_1, \text{ wherein}$$

the second rotation matrix $_{T3}^{T2}R$ is the second rotation data, and the second translation vector $^{T3}p_{T2}$ is the second translation data, wherein Log v represents a logarithmic operation of a matrix and wherein Exp v represents an exponential function of a matrix.

6. The method according to claim 3, further comprising:
building a verification map in a global coordinate system based on rotation matrices and translation vectors that are at the sampling moments of the reference sensor comprising $T_1$, $T_2$, and $T_3$, and based on the pose estimates of the terminal at the sampling moments, wherein
the verification map is used to provide reference data for determining an online pose estimate of the terminal.

7. The method according to claim 6, further comprising:
enabling an online positioning function of the terminal, and obtaining the verification map of the terminal;
obtaining observation data of any sensor L at any moment $t_3$,
after determining that
the sensor L is a third sensor of the first type, determining, from the sampling moments of the reference sensor, a sampling moment $T_4$ that is closest to $t_3$, and calculating fourth rotation data and fourth translation data of the third sensor at $T_4$ and a fourth covariance matrix corresponding to the fourth rotation data and the fourth translation data;
after determining that the sensor L is a fourth sensor of the second type, performing:
a) matching observation data of the fourth sensor at $t_3$ with the verification map, to determine reference rotation data and reference translation data that are of the fourth sensor at $t_3$; and determining, from the sampling moments of the reference sensor, a sampling moment $T_4$ that is closest to $t_3$, and calculating, based on the reference rotation data and the reference translation data of the fourth sensor at $t_3$, fifth rotation data and fifth translation data of the fourth sensor at $T_4$ and a fifth covariance matrix corresponding to the fifth rotation data and the fifth translation data, and
b) determining, from the sampling moments of the reference sensor, two sampling moments $T_5$ and $T_6$ that are closest to $t_3$, determining, based on a sampling interval of the fourth sensor and $t_3$, an interpolation coefficient $\lambda_5$ used when interpolation is performed at $T_5$ and an interpolation coefficient $\lambda_6$ used when interpolation is performed at $T_6$, calculating, based on $\lambda_5$, $\lambda_6$, and the observation data of the fourth sensor, sixth rotation data and sixth translation data of the fourth sensor from $T_5$ to $T_6$, and calculating a sixth covariance matrix corresponding to the sixth rotation data and the sixth translation data; and
merging rotation data, translation data, and covariance matrices that are at the sampling moments of the reference sensor comprising $T_4$, $T_5$, and $T_6$, to obtain the online pose estimate of the terminal, wherein
the rotation data comprises at least one of the fourth rotation data, the fifth rotation data, or the sixth rotation data, wherein the translation data comprises at least one of the fourth translation data, the fifth translation data, or the sixth translation data, and wherein the covariance matrices comprise at least one of the fourth covariance matrix, the fifth covariance matrix, or the sixth covariance matrix.

8. A sensor data processing device, comprising a processor and a non-transitory medium storing program instructions, wherein the processor, by executing the program instructions, causes the sensor data processing device to:
determine a reference sensor from at least two sensors in a terminal, and determine sampling moments of the reference sensor;
obtain observation data of any sensor, including
when obtaining observation data of any sensor K at any moment $t_1$, determining a sensor type of the sensor K, and
when the sensor K is a first sensor of a first type, determining, from the sampling moments of the reference sensor, a sampling moment $T_1$ that is closest to $t_1$, and determining, based on a sampling interval of the first sensor and $t_1$, an interpolation coefficient $\lambda_1$ used when interpolation is performed at $T_1$;
calculate, based on $\lambda_1$ and the observation data of the first sensor, first rotation data and first translation data of the first sensor at $T_1$, and calculate a first covariance matrix corresponding to the first rotation data and the first translation data, including
when the sensor K is a second sensor of a second type, determining, from the sampling moments of the reference sensor, two sampling moments $T_2$ and $T_3$ that are closest to $t_1$, and determine, based on a sampling interval of the second sensor and $t_1$, an interpolation coefficient $\lambda_2$ used when interpolation is performed at $T_2$ and an interpolation coefficient 1 used when interpolation is performed at $T_3$, and
calculating, based on $\lambda_2$ and $\lambda_3$ and the observation data of the second sensor, second rotation data and second translation data that are of the second sensor from $T_2$ to $T_3$, and calculating a second covariance matrix corresponding to the second rotation data and the second translation data; and
merge rotation data, translation data, and covariance matrices that are at the sampling moments of the reference sensor comprising $T_1$, $T_2$, and $T_3$ and that are obtained through processing by the processor, to obtain pose estimates of the terminal at the sampling moments, wherein
the rotation data comprises at least one of the first rotation data or the second rotation data, the translation data comprises at least one of the first translation data or the second translation data, and the covariance matrices comprise at least one of the first covariance matrix or the second covariance matrix.

9. The sensor data processing device according to claim 8, wherein the processor is configured to:
determine, based on the sampling interval of the first sensor, a closest adjacent sampling moment $t_2$ that is before $t_1$, and calculate, based on $t_1$ and $t_2$, the interpolation coefficient $\lambda_1$ used when interpolation is performed at $T_1$, wherein
$\lambda_1$ satisfies:

$$\lambda 1 = \frac{(T_1 - t_2)}{(t_1 - t_2)}.$$

10. The sensor data processing device according to claim 9, wherein the observation data of the first sensor comprises a rotation matrix and a translation vector that are of the first sensor;
the processor is configured to:
obtain a rotation matrix $_G^1R$ and a translation vector $^Gp_1$ of the first sensor at $t_1$, and a rotation matrix $_G^2R$ and a translation vector $^Gp_2$ of the first sensor at $t_2$; and
calculate, based on $\lambda_1$, $_G^1R$, $^Gp_1$, $_G^2R$, and $^Gp_2$, a first rotation matrix $_G^{T1}R$ and a first translation vector $^Gp_{T1}$ of the first sensor at $T_1$, wherein
$_G^{T1}R$ satisfies:

$$_G^{T1}R = \operatorname{Exp}(\lambda_1 \lfloor \operatorname{Log} v(_G^1R_G^2R^T) \rfloor) \times _G^2R; \text{ and}$$

$^Gp_{T1}$ satisfies:

$$^Gp_{T1} = (1-\lambda_1)^Gp_2 + \lambda_1{}^Gp_1, \text{ wherein}$$

the first rotation matrix $_G^{T1}R$ is the first rotation data, and the first translation vector $^Gp_{T1}$ is the first translation data, and wherein G represents a global coordinate system, Log v represents a logarithmic operation of a matrix, and T represents a transpose of a matrix.

11. The sensor data processing device according to claim 8, wherein the processor is configured to:
determine, based on the sampling interval of the second sensor and $t_1$, a closest adjacent sampling moment $t_2$ that is before $t_1$, and determine, based on $t_1$ and $t_2$, the interpolation coefficient $\lambda_2$ used when interpolation is performed at $T_2$ and the interpolation coefficient $\lambda_3$ used when interpolation is performed at $T_3$, wherein
$\lambda_2$ satisfies:

$$\lambda_2 = \frac{(T_2 - t_1)}{(t_1 - t_2)};$$

and
$\lambda_3$ satisfies:

$$\lambda_3 = \frac{(t_2 - T_3)}{(t_1 - t_2)},$$

wherein
$T_2$ represents a sampling moment closest to $t_1$ among the sampling moments of the reference sensor, and $T_3$ represents a sampling moment closest to $t_2$ among the sampling moments of the reference sensor.

12. The sensor data processing device according to claim 11, wherein the observation data of the second sensor comprises a rotation matrix and a translation vector of the second sensor;
the processor is configured to:
obtain a rotation matrix $_2^1R$ of the second sensor between $t_1$ and $t_2$ and a translation vector $^2p_1$ of the second sensor between $t_1$ and $t_2$; and
calculate, based on $\lambda_2$, $\lambda_3$, $_2^1R$, and $^2p_1$, a second rotation matrix $_{T3}^{T2}R$ and a second translation vector $^{T3}p_{T2}$ that are of a relative motion of the second sensor between $T_2$ and $T_3$, wherein
$_{T3}^{T2}R$ satisfies:

$$_{T3}^{T2}R = \operatorname{Exp} v[(1+\lambda_3+\lambda_2)\operatorname{Log} v(_2^1R)]; \text{ and}$$

$^{T3}p_{T2}$ satisfies:

$$^{T3}p_{T2} = (1+\lambda_3+\lambda_2)\operatorname{Exp} v[-\lambda_3 \operatorname{Log} v(_2^1R)]^2 p_1, \text{ wherein}$$

the second rotation matrix $_{T3}^{T2}R$ is the second rotation data, and the second translation vector $^{T3}p_{T2}$ is the second translation data, wherein Log v represents a logarithmic operation of a matrix and wherein Exp v represents an exponential function of a matrix.

13. The sensor data processing device according to claim 10, wherein the processor, by executing the program instructions, further causes the device to:
build a verification map in a global coordinate system based on rotation matrices and translation vectors that are at the sampling moments of the reference sensor comprising $T_1$, $T_2$, and $T_3$ and that are obtained through processing by the processor, and based on the pose estimates that are of the terminal at the sampling moments, and are obtained through processing by the processor; and
the verification map is used to provide reference data for determining an online pose estimate of the terminal.

14. The sensor data processing device according to claim 13, wherein the processor, by executing the program instructions, further causes the device to:
enable an online positioning function of the terminal, and obtain the verification map of the terminal,
when obtaining observation data of any sensor L at any moment $t_3$, determine a sensor type of the sensor L;
when the sensor L is a third sensor of the first type, determine, from the sampling moments of the reference sensor, a sampling moment $T_4$ that is closest to $t_3$;
calculate fourth rotation data and fourth translation data of the third sensor at $T_4$ and a fourth covariance matrix corresponding to the fourth rotation data and the fourth translation data;
if the sensor L is a fourth sensor of the second type, the processor further configured to:
match observation data of the fourth sensor at $t_3$ with the verification map, to determine reference rotation data and reference translation data of the fourth sensor at $t_3$; and determine, from the sampling moments of the reference sensor, a sampling moment $T_4$ that is closest to $t_3$;
calculate, based on the reference rotation data and the reference translation data of the fourth sensor at $t_3$, fifth rotation data and fifth translation data of the fourth sensor at $T_4$ and a fifth covariance matrix corresponding to the fifth rotation data and the fifth translation data;
determine, from the sampling moments of the reference sensor, two sampling moments $T_5$ and $T_6$ that are closest to $t_3$, and determine, based on a sampling interval of the fourth sensor and $t_3$, an interpolation coefficient $\lambda_5$ used when interpolation is performed at $T_5$ and an interpolation coefficient $\lambda_6$ used when interpolation is performed at $T_6$; and calculate, based on $\lambda_5$, $\lambda_6$, and the observation data of the fourth sensor, sixth rotation data and sixth translation data of the fourth sensor from $T_5$ to $T_6$, and calculate a sixth covariance matrix corresponding to the sixth rotation data and the sixth translation data; and merge rotation data, translation data, and covariance matrices that are at the sampling moments of the reference sensor comprising $T_4$, $T_5$, and $T_6$, to obtain the online pose estimate of the terminal, wherein the rotation data comprises at least one of the fourth rotation data, the fifth rotation data, or the sixth rotation data, wherein the translation data comprises at least one of the fourth translation data, the fifth translation data, or the sixth translation data, and wherein the covariance matrices comprise at least one of the fourth covariance matrix, the fifth covariance matrix, or the sixth covariance matrix.

\* \* \* \* \*